(12) United States Patent
Momiyama

(10) Patent No.: US 11,513,451 B2
(45) Date of Patent: Nov. 29, 2022

(54) IMAGE FORMING SYSTEM, INFORMATION CARRYOVER METHOD, SERVER APPARATUS, STORAGE MEDIUM, IMAGE FORMING APPARATUS, AND IMAGE PROCESSING SYSTEM

(71) Applicant: CANON KABUSHIKI KAISHA, Tokyo (JP)

(72) Inventor: Daisuke Momiyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 17/111,591

(22) Filed: Dec. 4, 2020

(65) Prior Publication Data

US 2021/0181653 A1   Jun. 17, 2021

(30) Foreign Application Priority Data

Dec. 17, 2019  (JP) .............................. JP2019-227701

(51) Int. Cl.
| | | |
|---|---|---|
| *G03G 15/00* | (2006.01) | |
| *G03G 15/08* | (2006.01) | |
| *H04N 1/60* | (2006.01) | |
| *G03G 15/36* | (2006.01) | |
| *H04N 1/00* | (2006.01) | |

(52) U.S. Cl.
CPC ......... *G03G 15/0863* (2013.01); *G03G 15/36* (2013.01); *H04N 1/00039* (2013.01); *H04N 1/00204* (2013.01); *H04N 1/00915* (2013.01); *H04N 1/60* (2013.01)

(58) Field of Classification Search
CPC ............... G03G 15/36; G03G 15/0863; G03G 15/5079; G03G 15/556
USPC ............................. 399/38, 42–45, 75, 79, 80
See application file for complete search history.

(56) References Cited

U.S. PATENT DOCUMENTS

| | | | | |
|---|---|---|---|---|
| 5,543,892 | A * | 8/1996 | Hirata ................ | G03G 15/5079 399/1 |
| 9,042,750 | B2 * | 5/2015 | Kaneko ............... | G03G 15/556 399/35 |
| 9,116,492 | B2 * | 8/2015 | Kawana ............. | G03G 15/5079 |

FOREIGN PATENT DOCUMENTS

| | | |
|---|---|---|
| JP | 4784122 B2 | 10/2011 |
| JP | 2015-095776 A | 5/2015 |

* cited by examiner

*Primary Examiner* — Hoan H Tran
(74) *Attorney, Agent, or Firm* — Carter, DeLuca & Farrell LLP

(57) ABSTRACT

There is provided an image forming system including at least a first image forming apparatus that includes a first image forming unit and an obtaining unit configured to obtain operation-related information related to an operation of the first image forming unit. The image forming system further includes a carryover unit configured to carry over, to a second image forming apparatus, information related to an operation of a second image forming unit of the second image forming apparatus among the operation-related information obtained by the first image forming apparatus when the second image forming apparatus is newly used in the image forming system. The operation-related information includes operation history information of the first image forming unit.

20 Claims, 13 Drawing Sheets

FIG. 4

PLEASE SELECT YOUR PREFERENCE AND TENDENCY

Q1. KIND OF DATA HANDLED
- ○ MAINLY DOCUMENT DATA (a11)
- ○ MAINLY GRAPHIC DATA (a12)
- ○ HALF AND HALF (a13)

Q2. NOISE OF SURROUNDINGS
- ○ SURROUNDINGS ARE QUIET (a21)
- ○ SURROUNDINGS ARE NOT QUIET (a22)

Q3. IMPORTANCE OF IMAGE QUALITY
- ○ MOST IMPORTANT (a31)
- ○ RELATIVELY IMPORTANT (a32)
- ○ NOT IMPORTANT (a33)

Q4. IMAGE QUALITY vs. PRINTING SPEED
- ○ IMAGE QUALITY IS MORE IMPORTANT (a41)
- ○ PRINTING SPEED IS MORE IMPORTANT (a42)

Q5. PRODUCTIVITY vs. LIFETIME
- ○ PRODUCTIVITY IS MORE IMPORTANT (a51)
- ○ LIFETIME IS MORE IMPORTANT (a52)

Q6. IMPORTANCE OF ENERGY-SAVING
- ○ IT IS MOST IMPORTANT (a61)
- ○ IT IS RELATIVELY IMPORTANT (a62)
- ○ IT IS NOT IMPORTANT (a63)

[ OK ]

400

FIG. 5
PLEASE SET YOUR LEVEL OF PREFERENCE
NOT IMPORTANT AT ALL          MOST IMPORTANT
1   2   3   4   5   6   7   8   9   10
IMAGE QUALITY 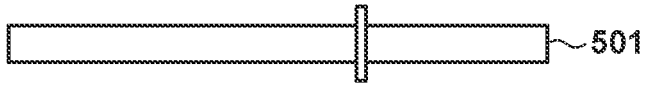 ~501
QUIETNESS 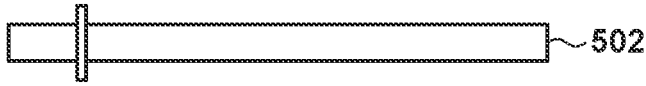 ~502
PRODUCTIVITY  ~503
APPARATUS LIFETIME  ~504
ENERGY-SAVING  ~505
[ OK ]
FIG. 6
PERFORM INFORMATION CARRYOVER?
⊙ YES
○ NO    ---601
PLEASE INPUT IDENTIFICATION NUMBER AND PASSWORD OF INFORMATION CARRYOVER SOURCE APPARATUS
IDENTIFICATION NUMBER  ~602
PASSWORD 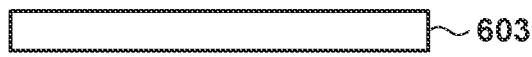 ~603
[ OK ]

PLEASE ANSWER Q7 PERTAINING TO YOUR PREFERENCE AND TENDENCY

Q1. KIND OF DATA HANDLED

Q2. NOISE OF SURROUNDINGS

Q3. IMPORTANCE OF IMAGE QUALITY

Q4. IMAGE QUALITY vs. PRINTING SPEED

Q5. PRODUCTIVITY vs. LIFETIME

Q6. IMPORTANCE OF ENERGY-SAVING

Q7. OBTAINMENT OF PRINT MATERIAL

○ I OFTEN GO TO OBTAIN MATERIALS IMMEDIATELY (a71)

○ I OFTEN LET MATERIALS ACCUMULATE (a72)

OK

IMAGE FORMING SYSTEM, INFORMATION CARRYOVER METHOD, SERVER APPARATUS, STORAGE MEDIUM, IMAGE FORMING APPARATUS, AND IMAGE PROCESSING SYSTEM

BACKGROUND OF THE INVENTION

Field of the Invention

The present disclosure relates to an image forming system, an information carryover method, a server apparatus, a storage medium, an image forming apparatus, and an image processing system.

Description of the Related Art

In image forming apparatuses such as copiers, printers, and multifunction peripherals, techniques are known in which image forming operations are adjusted in accordance with a history of apparatus operations or a user's preferences. For example, Japanese Patent Publication No. 4784122 discloses an image forming apparatus that, on the basis of a past operation history, adjusts the spacing and rotational speed of a transport roller pair that transports paper. Japanese Patent Laid-Open No. 2015-95776 discloses an image forming apparatus that recognizes an evaluation item that might draw much interest from a user based on a history of operations, such as the viewing and adjustment of images by the user, and sets a criterion with regard to the recognized evaluation item to execute adjustment processing such as color correction.

SUMMARY OF THE INVENTION

However, it takes a relatively long time to accumulate a sufficient amount of history information for appropriately adjusting or setting apparatus operations. For example, if, when a printer is introduced into a new environment, it is necessary for the new printer to collect information for operation adjustment from scratch, the operations of the new printer will not be optimal until a sufficient amount of information has been accumulated. However, if there is already an existing printer in the same environment, information already collected by the existing printer is likely to contain information useful for the new printer as well. This situation applies not only to image forming apparatuses such as printers, but also to image processing apparatuses, such as scanners, in general.

It is therefore desirable to realize a mechanism that allows for providing as appropriate image processing operations as possible without wasting time on re-collecting information that has already been collected in the past.

According to one aspect, there is provided an image forming system including at least a first image forming apparatus, wherein the first image forming apparatus includes a first image forming unit and an obtaining unit configured to obtain operation-related information related to an operation of the first image forming unit, and wherein the image forming system further includes: a carryover unit configured to carry over, to a second image forming apparatus, information related to an operation of a second image forming unit of the second image forming apparatus among the operation-related information obtained by the first image forming apparatus when the second image forming apparatus is newly used in the image forming system, and the operation-related information includes operation history information of the first image forming unit. A corresponding method, server apparatus, program, image forming apparatus, and image processing system are also provided.

Further features of the present invention will become apparent from the following description of exemplary embodiments (with reference to the attached drawings).

BRIEF DESCRIPTION OF THE DRAWINGS

FIG. 4 is a diagram illustrating a first example of a graphical user interface (GUI) for accepting an input of user preference information.

FIG. 5 is a diagram illustrating a second example of a GUI for accepting an input of user preference information.

FIG. 6 is a diagram illustrating an example of a GUI for designating an information carryover source apparatus.

FIG. 7 is a diagram illustrating an example of a GUI for accepting an additional input of user preference information.

DESCRIPTION OF THE EMBODIMENTS

Figure 1:
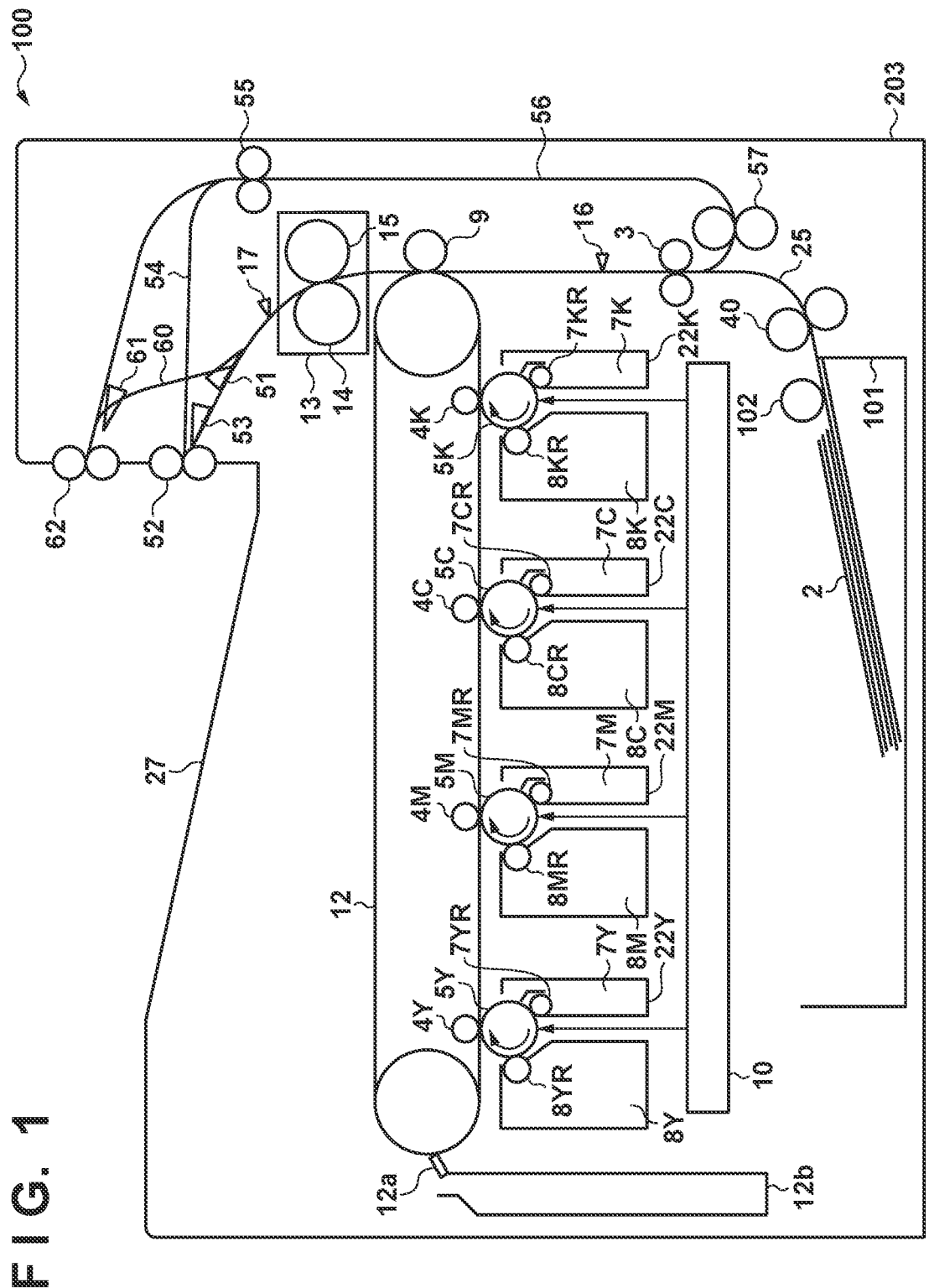
FIG. 1 is a schematic diagram illustrating an example of the configuration of a printer device.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

1. Overview

This section will primarily describe an example of techniques according to the present disclosure being applied in an image forming system that includes a printer. However, the techniques according to the present disclosure can be broadly applied in image processing systems which include image processing apparatuses not limited to printers (e.g., copiers, multifunction peripherals, or scanners). Unless specified otherwise, each of the constituent elements such as apparatuses, devices, modules, and chips described below may be constituted by a single entity, or may be constituted by multiple physically-distinct entities.

1-1. Example of Configuration of Image Forming Unit

FIG. 1 is a schematic diagram illustrating an example of the configuration of a printer device 100, which serves as an image forming unit of an image forming apparatus according to an embodiment. Here, as an example, the printer device 100 is assumed to be a color laser printer that prints in four colors, namely yellow (Y), magenta (M), cyan (C), and black (K), using the electrophotographic method.

Referring to FIG. 1, the printer device 100 includes, for each of four color stations, a primary transfer roller 4Y, 4M, 4C, 4K, a photosensitive drum 5Y, 5M, 5C, 5K, a charging unit 7Y, 7M, 7C, 7K, and a developing unit 8Y, 8M, 8C, 8K. The photosensitive drums 5Y, 5M, 5C, and 5K, the charging units 7Y, 7M, 7C, and 7K, and the developing units 8Y, 8M, 8C, and 8K are mounted in corresponding ones of cartridges 22Y, 22M, 22C, and 22K, which are removable from a main body (also called a "housing") of the printer device 100.

Each of the photosensitive drums 5Y, 5M, 5C, and 5K is constituted by an aluminum cylinder and an organic photo-conductive layer applied to the outer surface of the aluminum cylinder, and rotates in the clockwise direction in response to the transmission of drive power from a drive motor (not shown). The charging units 7Y, 7M, 7C, and 7K include charging rollers 7YR, 7MR, 7CR, and 7KR, respectively, and the charging rollers 7YR, 7MR, 7CR and 7KR uniformly charge the surfaces of the photosensitive drums 5Y, 5M, 5C, and 5K, respectively. A scanner unit 10 then selectively irradiates the surfaces of the photosensitive drums 5Y, 5M, 5C, and 5K with light, which forms electrostatic latent images on the photosensitive drums 5Y, 5M, 5C, and 5K. The developing units 8Y, 8M, 8C, and 8K include developing rollers 8YR, 8MR, 8CR, and 8KR, respectively, and the developing rollers 8YR, 8MR, 8CR, and 8KR use toner to visualize the electrostatic latent images formed on the photosensitive drums 5Y, 5M 5C, and 5K, respectively.

During image formation, an intermediate transfer belt 12 rotates in the counterclockwise direction in the figure while being in contact with the photosensitive drums 5Y, 5M, 5C, and 5K. A primary transfer bias is applied to the primary transfer rollers 4Y, 4M, 4C, and 4K, and the primary transfer bias causes the primary transfer of the visible images on the photosensitive drums 5Y, 5M, 5C, and 5K onto the intermediate transfer belt 12. The color visible image transferred onto the intermediate transfer belt 12 undergoes secondary transfer, onto paper 2, at a nip part (secondary transfer position) between a secondary transfer roller 9 and the intermediate transfer belt 12. The primary transfer rollers 4Y. 4M, 4C, and 4K and the secondary transfer roller 9 rotate with the rotation of the intermediate transfer belt 12.

The visible image partially remains on the intermediate transfer belt 12 without being transferred to the paper 2 at the secondary transfer position. This residual visible image is removed through a cleaning operation. In the cleaning operation, the residual visible image transported by the intermediate transfer belt 12 to a cleaning blade 12a is scraped off by the cleaning blade 12a, and collected in a waste toner receptacle 12b.

A cassette tray 101 is a container that contains a plurality of sheets of paper (also called "recording material") 2. A paper feed roller 102 rotates under an attractive force from a paper feed solenoid (not shown) during the rotation of a paper feed motor (not shown). The paper feed roller 102 feeds the paper 2 from the cassette tray 101 to a transport path 25, which transports the paper 2 to a registration roller (also called a "register roller") 3. A registration sensor (also called a "register sensor") 16 is disposed partway along the transport path 25, and the register sensor 16 detects a leading end of the paper 2. The register roller 3 transports the paper 2 to the secondary transfer position in accordance with the timing at which the register sensor 16 has detected the leading end of the paper 2.

A fixing unit 13 includes a fixing roller 14 to heat the paper 2 and a pressure roller 15 to press the paper 2 against the fixing roller 14, and fixes the color visible image transferred to the paper 2 while transporting the paper 2. The fixing roller 14 and the pressure roller 15 are formed having hollow shapes, and a heater is built into an interior of the fixing roller 14. The paper 2 on which the color visible image has been formed is heated and pressurized while being transported by the fixing roller 14 and the pressure roller 15, and as a result, the toner of the visible image is fixed to the surface of the paper 2. After the visible image has been fixed, the paper 2 is discharged to a discharge tray 27 by a discharge roller 52. Note that a fixing and discharge sensor 17, which is disposed downstream from the fixing unit 13, detects the presence of the paper 2.

1-2. Description of Issues

Consider an idea of adjusting the image forming operations performed by the printer device 100 described above in accordance with a device operation history or a user's preferences. For example, the frequency with which different paper sizes or paper types have been used in the past, or an average printing ratio, can serve as indicators for how much rollers should be preheated while the device is standing by. Because curling is more likely to occur when the temperature or humidity of the device's operating environment is high, lowering the operating speed or the fixing temperature in consideration of the ambient temperature or ambient humidity is also beneficial in terms of preventing curling. Improved image quality can also be provided to the user by automatically calibrating the device when environmental conditions change significantly or before performing a large number of prints. However, the way in which the device's operations are adjusted affects performance indicators such as image quality, quietness, and productivity, and there are tradeoffs between these performance indicators. It is therefore desirable to first understand which performance indicators are important to a user, and then adjust operations so as to improve, or avoid degrading, those performance indicators.

However, once an apparatus is introduced into an environment, it takes a relatively long time to accumulate a sufficient amount of information for appropriately adjusting or setting apparatus operations. If, when anew apparatus is introduced into an environment, it is necessary for the new apparatus to collect information for operation adjustment from scratch, the operations of the new apparatus will not be optimal until a sufficient amount of information has been accumulated. The task of inputting a user's preferences into the new apparatus also places a burden on the user. However, if there is already an existing apparatus in the same environment, information already collected by the existing apparatus is likely to contain information useful for the new apparatus as well.

Accordingly, as will be described in detail in the following sections, the present embodiment introduces a mechanism that enables information collected by a certain apparatus in the past to be carried over to another apparatus. This provides as appropriate operations as possible without wasting time on re-collecting information that has already been collected in the past.

2. Configuration of Image Forming System 2-1. Overall Configuration

Figure 2:
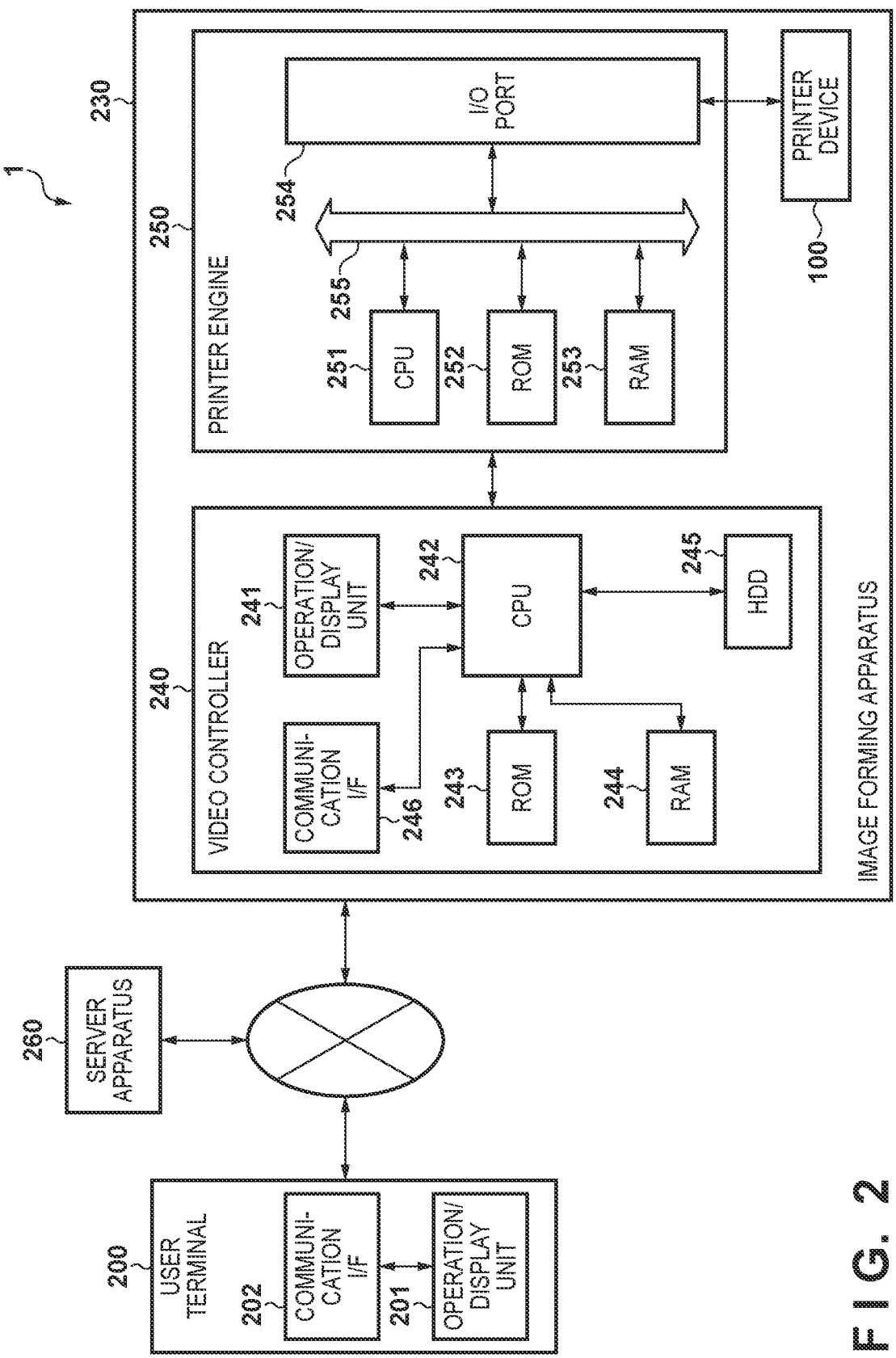
FIG. 2 is a schematic diagram illustrating an example of the configuration of an image forming system according to an embodiment.

FIG. 2 is a schematic diagram illustrating an example of the configuration of an image forming system 1 according to the present embodiment. As illustrated in FIG. 2, the image forming system 1 includes a user terminal 200, an image forming apparatus 230, and a server apparatus 260.

The user terminal 200 is a terminal apparatus used by a user of the image forming system 1. The user terminal 200 may be a general-purpose information terminal such as a personal computer (PC) or a smartphone, or may be a dedicated terminal specialized for a specific business purpose. The user terminal 200 includes an operation/display unit 201 and a communication I/F 202. The operation/display unit 201 includes a display that displays images and information and an input device that accepts operations made by the user (e.g., a keyboard, a mouse, a keypad, or a touch sensor). The communication I/F (interface) 202 is an interface for communication between the user terminal 200 and other apparatuses. When the user makes an instruction to print through the operation/display unit 201, the communication IF 202 transmits a print job to the image forming apparatus 230.

The image forming apparatus 230 includes the printer device 100, which was described with reference to FIG. 1, as well as a video controller 240 and a printer engine 250. The video controller 240 includes an operation/display unit 241, a CPU 242, ROM 243, RAM 244, an HDD 245, and a communication I/F 246. The operation/display unit 241 includes, for example, an operation panel and operation buttons. The CPU (Central Processing Unit) 242 is a processor that controls the overall functions of the image forming apparatus 230. The ROM (Read-Only Memory) 243 is non-volatile memory storing a boot program executed at the beginning of the startup of the CPU 242. The RAM (Random Access Memory) 244 is what is known as main memory, and provides a temporary storage region for the CPU 242. The HDD (Hard Disk Drive) 245 is an auxiliary storage device, and stores computer programs for the operations of the image forming apparatus 230, data of images to be printed, and operation-related information (described later). The communication I/F 246 is an interface for communication between the image forming apparatus 230 and other apparatuses. A print job to be executed by the image forming apparatus 230 is received, for example, from the user terminal 200 via the communication I/F 246, or is accepted via the operation/display unit 241. The communication I/F 246 transmits the operation-related information, which is collected by the image forming apparatus 230, to the server apparatus 260 over a network.

The printer engine 250 is an image processing engine dedicated to the control of the printer device 100. The printer engine 250 includes a CPU 251, ROM 252, RAM 253, an I/O port 254, and a system bus 255. The CPU 251 is a processor that controls image forming operations performed by the printer device 100. The ROM 252 is non-volatile memory, and stores programs executed by the CPU 251. The RAM 253 provides a temporary storage region for the CPU 251. The I/O port 254 is connected to various actuators and sensors in the aforementioned printer device 100, and sends control outputs to the actuators and accepts sensor inputs. The system bus 255 handles the bidirectional exchange of signals among the CPU 251, the ROM 252, the RAM 253, and the I/O port 254.

Although FIG. 1 illustrates a single image forming apparatus 230, the image forming system 1 may include a plurality of image forming apparatuses. Likewise, the image forming system 1 may include a plurality of user terminals.

The server apparatus 260 is an apparatus that centrally manages the operation-related information collected by the image forming apparatus 230. The server apparatus 260 may be, for example, a data server or storage server connected to a local area network (LAN) in a company, a home network, or a cloud network. In the present embodiment, the server apparatus 260 stores the operation-related information received from the image forming apparatus 230 in association with identification information identifying the image forming apparatus 230. The operation-related information received from the image forming apparatus 230 can include, for example, user preference information, operation history information, and environmental condition information. As will be described later, when a new image forming apparatus begins being used in the image forming system 1, the server apparatus 260 takes information, of the operation-related information obtained from the image forming apparatus 230, which is related to the operation of the new image forming apparatus, and carries that information over to the new image forming apparatus.

2-2. Functions of Image Forming Apparatus

Figure 3:
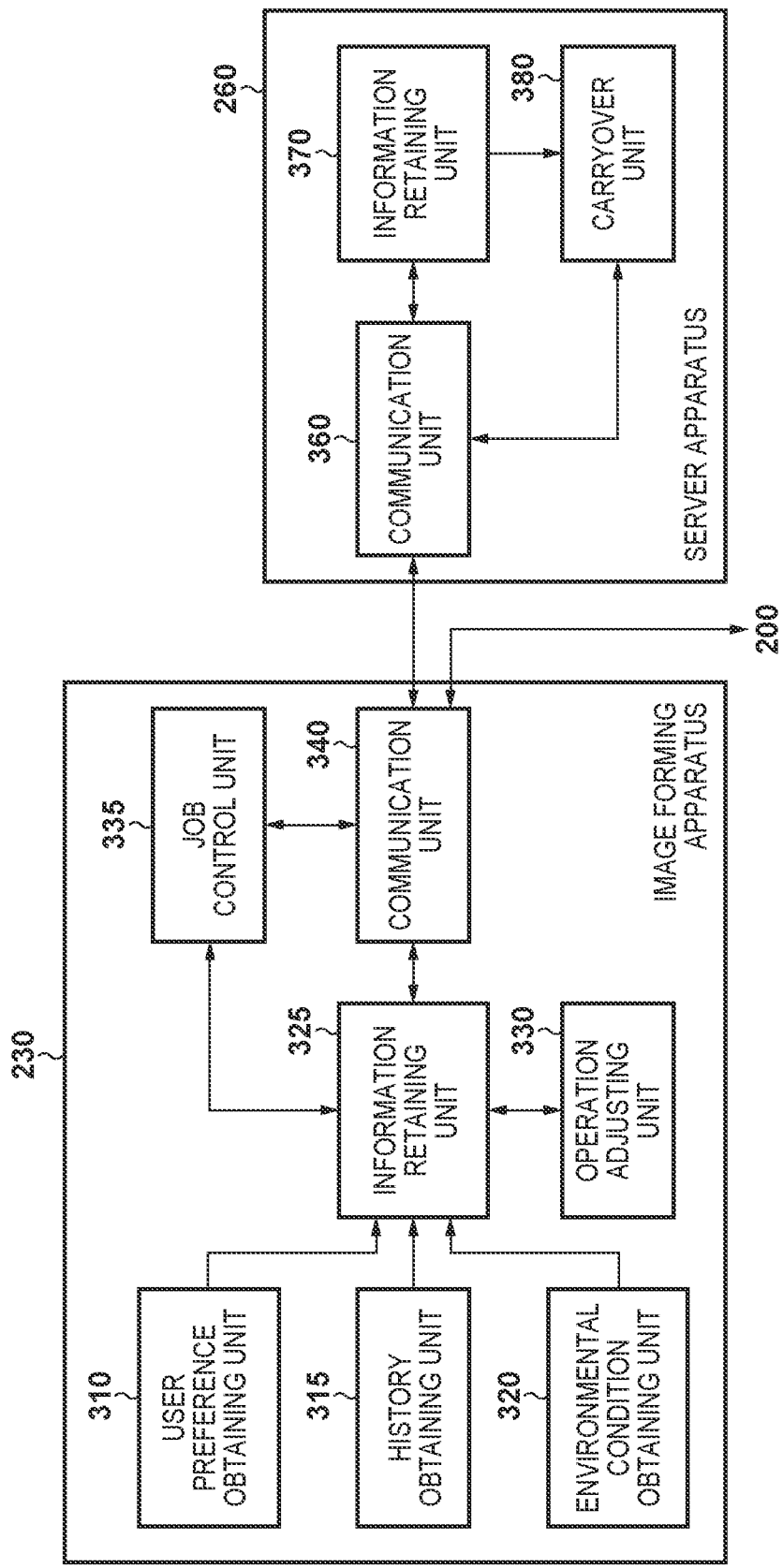
FIG. 3 is a block diagram illustrating an example of the functional configurations of an image forming apparatus and a server apparatus illustrated in FIG. 2.

FIG. 3 is a block diagram illustrating an example of the functional configurations of the image forming apparatus 230 and the server apparatus 260 illustrated in FIG. 2. As illustrated in FIG. 3, the image forming apparatus 230 includes a user preference obtaining unit 310, a history obtaining unit 315, an environmental condition obtaining unit 320, an information retaining unit 325, an operation adjusting unit 330, a job control unit 335, and a communication unit 340.

The user preference obtaining unit 310 obtains user preference information, expressing the user's preference with respect to at least one performance indicator for the image forming operations, as part of the operation-related information of the image forming apparatus 230. The performance indicators of the image forming operations can include, for example, at least one of the following:

Image quality: quality of a printed image
Quietness: little amount of noise being produced during printing operations
Productivity: ability to print more images in a set amount of time
Apparatus lifetime: length of service life of the apparatus
Energy-saving performance: low power consumption
First output time: a shorter time from the start of printing operations to when the printing of the first page is complete Note that the first output time for a printer may also be referred to as the first print output time (FPOT). The "user's preference" with respect to these performance indicators typically means how much importance the user places on each performance indicator (relative to the other performance indicators).

The user preference obtaining unit 310 may obtain the user preference information by, for example, causing a GUI for inquiring with the user about their preferences to be displayed in a screen of the operation/display unit 241, and accepting a response to the inquiry through the GUI. FIG. 4 is a diagram illustrating a first example of the GUI for accepting an input of the user preference information. An input window 400 illustrated in FIG. 4 is a GUI for making inquiries in what is known as a questionnaire format. The input window 400 displays six questions pertaining to the performance indicators of image forming operations, with multiple options available for each question. The user can enter an answer to each question by selecting (e.g., by touching) an option that matches their preferences and tendencies. The input window 400 may be displayed during the initial setup period of the image forming apparatus 230, and at any point in time when the user wishes to change the user preference information. The input window 400 may be displayed in a screen of the operation/display unit 201 of the user terminal 200. Here, the "user" may be a person who uses the image forming apparatus 230, or may be a manager or engineer who manages the operation of the image forming apparatus 230.

The user preference obtaining unit 310 can, for example, acquire user preference information that expresses the user's preference as a numerical value on the basis of the answers provided by the user in the input window 400. For example, each option in the input window 400 is assigned a preference score in advance, as shown in the following table. Note that here, the first output time is not treated as a performance indicator.

TABLE 1

Example of Assignment of Preference Scores to Performance Indicators by Option

| Question | Option | Preference score | | | | |
| --- | --- | --- | --- | --- | --- | --- |
| | | Image quality | Quietness | Productivity | Lifetime | Energy savings |
| Q1 | a11 | 0 | 0.5 | 0.5 | 1 | 0.7 |
| | a12 | 1 | 0.5 | 0.5 | 0 | 0.3 |
| | a13 | 0.5 | 0.5 | 0.5 | 0.5 | 0.2 |
| Q2 | a21 | 0.5 | 1 | 0.5 | 0.5 | 0.5 |
| | a22 | 0.5 | 0 | 2 | 0.5 | 0.5 |
| Q3 | a31 | 1 | 0.5 | 0.5 | 0 | 0.3 |
| | a32 | 0.5 | 0.5 | 0.5 | 0.5 | 0.5 |
| | a33 | 0 | 0.5 | 2 | 1 | 0.7 |
| Q4 | a41 | 2 | 1 | 0.5 | 0.3 | 0.6 |
| | a42 | 0 | 0.5 | 2 | 0.7 | 0.4 |
| Q5 | a51 | 0.5 | 0.5 | 2 | 0 | 0.3 |
| | a52 | 0.5 | 0.5 | 0 | 2 | 0.7 |
| Q6 | a61 | 0.1 | 0.1 | 0.1 | 0.6 | 2 |
| | a62 | 0.3 | 0.3 | 0.3 | 0.3 | 1 |
| | a63 | 0.5 | 0.5 | 0.5 | 0 | 0 |

Then, the user preference obtaining unit 310 calculates a preference score for each performance indicator by totaling the preference scores assigned to each performance indicator through the options selected as answers to the six questions. For example, if option a11 is selected for question Q1, option a22 for question Q2, option a33 for question Q3, option a42 for question Q4, option a5 for question Q5, and option a62 for question Q6, the preference scores are calculated as follows:

{image quality, quietness, productivity, lifetime, energy savings}={1.3, 2.3, 8.8, 3.5, 3.6}

This example of the preference scores indicates that it is preferable to the user that productivity is high even if image quality and quietness are low. Assuming the number of performance indicators is N, the user preference information can be an N-dimensional vector indicating the values of such preference scores.

Instead of obtaining user preference information in questionnaire format, as in the example in FIG. 4, the user preference obtaining unit 310 may allow the user to directly input a value of the preference score for each performance indicator. FIG. 5 is a diagram illustrating a second example of the GUI for accepting an input of the user preference information. An input window 500 shown in FIG. 5 has five sliders 501 to 505, each of which makes it possible to designate a preference score (e.g., a level of importance to the user) on a 10-point scale, for the five performance indicators of image quality, quietness, productivity, lifetime, and energy savings. The user can enter a preference score by designating a higher score for the performance indicator he or she considers more important and selecting the OK button. In the example of FIG. 5, the following preference scores can be obtained, for example.

{image quality, quietness, productivity, lifetime, energy savings}={7.0, 2.0, 3.0, 6.0, 3.0}

This preference score example indicates that the user places a relatively higher importance on image quality and apparatus lifetime than on the other indicators. The user preference obtaining unit 310 outputs the user preference information obtained in this manner to the information retaining unit 325.

The history obtaining unit 315 obtains operation history information, which is a history of image forming operations, as part of the operation-related information of the image forming apparatus 230, when a print job is executed by the printer device 100 of the image forming apparatus 230. Here, the history of operations can include, for example, at least one of the following:

Paper size: the size of the paper consumed (A4, A3, letter, or the like)

Paper type: the type of paper consumed (standard paper, glossy paper, or the like)

Number of printouts: the number of sheets of paper consumed

Average printing ratio: an average value of the printing ratio per paper or job basis The average printing ratio is, for example, an average value of percent densities of respective pixels, on a color-by-color basis, across a printed image, totaled for the four colors. For example, in a case where an image is printed in which half of the printing region of the paper is uniformly occupied by a color consisting of 100% magenta and 100% cyan, the average printing ratio will be (100+100)×½=100%. The history obtaining unit 315 outputs the operation history information to the information retaining unit 325.

The environmental condition obtaining unit 320 obtains environmental condition information indicating environmental conditions in the operating environment of the image forming apparatus 230, periodically, for example. Here, the environmental conditions can include, for example, at least one of the following:

Ambient temperature: the temperature of the operating environment

Ambient humidity: the humidity of the operating environment

The cycle at which the environmental condition information is obtained may be any length, e.g., several minutes, an hour, several hours, or the like. The environmental condition obtaining unit 320 may, for example, use a temperature sensor and a humidity sensor (neither of which are shown) to measure the ambient temperature and ambient humidity at a measurement timing which arrives periodically. Additionally, the environmental condition obtaining unit 320 may calculate an average of the measurement values resulting from a plurality of measurements. The environmental condition obtaining unit 320 outputs the environmental condition information to the information retaining unit 325.

The information retaining unit 325 retains the operation-related information pertaining to the image forming operations of the printer device 100 by storing the information in the HDD 245, for example. Typically, the operation-related information is information used to adjust or set the image forming operations. The operation-related information can include the user preference information input from the user preference obtaining unit 310, the operation history information input from the history obtaining unit 315, and the environmental condition information input from the environmental condition obtaining unit 320. As described above, the user preference information can be obtained during the initial setup period of the apparatus. On the other hand, the operation history information is obtained each time the printer device 100 executes a print job, and is accumulated as time passes. The environmental condition information is obtained periodically, and is also accumulated as time passes.

The information retaining unit 325 may aggregate, over a given period (e.g., one day), values of each of information items in the operation history information obtained per job basis, and then store a result of the aggregation. For example, the number of printouts for each paper size can be aggregated from the information of the paper size and the number of printouts. Likewise, the number of printouts for each paper type can be aggregated from the information of the paper type and number of printouts. Furthermore, the number of printouts for each of average printing ratio ranges, as indicated below, can be aggregated from the information of the average printing ratio and the number of printouts.

TABLE 2

Example of Number of Printouts for Each Average Printing Ratio Range

| | Range of Average Printing Ratio | | | | | | |
|---|---|---|---|---|---|---|---|
| | 0-1% | 1-2% | 2-5% | 5-10% | 10-20% | 20-50% | 50-100% |
| Number of Printouts | 200 | 250 | 30 | 25 | 10 | 5 | 0 |

Additionally, the information retaining unit 325 can retain the periodically-obtained environmental condition information in association with a time or a time period. For example, the environmental condition information can be stored in the form of the temperature and humidity at midnight (or midnight to 1:00 a.m.), the temperature and humidity at 1:00 a.m. (or 1:00 a.m. to 2:00 p.m.), the temperature and humidity at 11:00 p.m. (or 11:00 p.m. to midnight), and so on in this manner.

Furthermore, the information retaining unit 325 may generate analysis result information by analyzing one or both of past operation history information and past environmental condition information, and may store the generated analysis result information as the operation-related information. For example, the information retaining unit 325 may estimate the remaining lifetime of the image forming apparatus 230 (e.g., as a percentage) on the basis of the total number of printouts which have been executed. The remaining lifetime may be estimated on the basis of another parameter, such as the total number of rotations of the fixing roller (which can be obtained as the operation history). At least one of the following can be included as another example of the analysis result information:

Likelihood of curling: high/low
Frequency of printing onto glossy paper at a high printing ratio: high/low
Low environmental variability and mainly a low printing ratio: applicable/not applicable This analysis result information can also be stored in the HDD 245 as part of the operation-related information.

Using the operation-related information retained in the information retaining unit 325, the operation adjusting unit 330 adjusts or sets the image forming operations of the printer device 100. For example, the operation adjusting unit 330 may adjust or set a variety of operation parameters in the printer device 100 on the basis of the user preference information, depending on how much importance the user places on each of the performance indicators. Additionally, the operation adjusting unit 330 may adjust or set a variety of operation parameters of the printer device 100 on the basis of one or more of the above-described operation history information, environmental condition information, and analysis result information. Here, the operation parameters of the printer device 100 which can be adjusted or set can include, for example, at least one of the following:

Level or timing of roller preheating
Paper transport speed (rotational speed of transport rollers)
Spacing between transport roller pairs
Waiting time before transitioning to sleep mode
Color correction profile
Cleaning frequency To describe a specific example, a given printer has a function for stopping the heater within the fixing roller 14 while in a standby mode (i.e., stopping preheating) in order to improve the energy-saving performance. Preheating the fixing roller 14 is particularly useful for improving the image quality in a case where printing onto large-sized paper is carried out frequently. On the other hand, in a case where printing onto large-sized paper is not carried out frequently, the disadvantage of the energy wasted from preheating may outweigh the effect of improving the image quality through the preheating. Accordingly, when energy-saving performance is to be prioritized, or when the operation history indicates that printing onto large-sized paper is not often carried out, the operation adjusting unit 330 shortens the time for driving the heater in the fixing roller 14, or lowers a target temperature for the preheating.

The operation adjusting unit 330 may execute calibration for adjusting the operation parameters of the printer device 100 at a timing determined on the basis of the operation-related information retained by the information retaining unit 325. The timing of the calibration may be, for example, a timing at which environmental conditions such as the ambient temperature and the ambient humidity are expected to change significantly, or a timing at which a large number of printouts are expected to be performed.

The job control unit 335 controls execution of print jobs in the image forming apparatus 230. For example, when a print job has been received from the user terminal 200 via the communication unit 340, the job control unit 335 controls the printer device 100 through the printer engine 250 to form an image onto paper in accordance with the print job. Additionally, when the execution of the print job ends, the job control unit 335 causes the history obtaining unit 315 to obtain the operation history information for the job which has been executed.

A communication unit 340 receives the print job from the user terminal 200 using the communication I/F 246. Additionally, the communication unit 340 transmits the progress and execution result of the print job to the user terminal 200. Additionally, in the present embodiment, the communication unit 340 uses the communication I/F 246 to transmit the operation-related information of the image forming apparatus 230, which is retained by the information retaining unit 325, to the server apparatus 260. The transmission of the operation-related information to the server apparatus 260 may be performed periodically (e.g., once a day), or each time the information has been updated. The communication unit 340 may transmit identification information (e.g., a serial number) identifying the image forming apparatus 230 to the server apparatus 260 along with the operation-related information. Additionally, the communication unit 340 may transmit apparatus information (e.g., a model number) pertaining to the function, configuration, and use of the image forming apparatus 230 to the server apparatus 260 along with the operation-related information.

Furthermore, in the present embodiment, when the image forming apparatus 230 is newly put into use in the system, the communication unit 340 can receive, from the server apparatus 260, operation-related information which has already been collected by an existing apparatus. In the following descriptions, the operation-related information received from the server apparatus 260 in this manner will be called "carryover information". Upon receiving the carryover information from the server apparatus 260, the communication unit 340 outputs the received carryover information to the information retaining unit 325. The information retaining unit 325 stores the carryover information in the HDD 245 as operation-related information. Even at the beginning of use, the operation adjusting unit 330 can adjust the image forming operations of the printer device 100 through the method described in the example above, by using the carryover information provided by an existing apparatus and retained in the information retaining unit 325.

2-3. Functions of Server Apparatus

As illustrated in FIG. 3, the server apparatus 260 includes a communication unit 360, an information retaining unit 370, and a carryover unit 380.

The communication unit 360 receives the above-described operation-related information of the image forming apparatus 230 from the communication unit 340 of the image forming apparatus 230. The communication unit 360 outputs the received operation-related information to the information retaining unit 370. Additionally, when a new apparatus starts being used in the image forming system 1, the communication unit 360 transmits, to the new apparatus, carryover information selected by the carryover unit 380 as described later, from operation-related information already collected in the past by an existing apparatus. The carryover information can be provided to the new apparatus in accordance with, for example, an information carryover request which can be received from the new apparatus.

The information retaining unit 370 obtains, via the communication unit 360, the above-described operation-related information collected by the image forming apparatus 230 in the image forming system 1, and centrally retains the obtained operation-related information. For example, the information retaining unit 370 stores the operation-related information received from the image forming apparatus 230 in storage (e.g., an HDD) in association with the identification information and the apparatus information of the image forming apparatus 230. The identification information and the apparatus information can, for example, include at least one of the following:

Serial number: a number uniquely identifying the source apparatus

Supported paper sizes: paper sizes onto which the apparatus can print (e.g., A4/A3)

Supported paper types: paper types onto which the apparatus can print

Function type: single-function peripheral (SFP) or multi-function peripheral (MFP)

Model number: number related to the functions and configuration of the apparatus Date of manufacture: date on which the apparatus was manufactured Usage type: information identifying the intended use of the apparatus (e.g., personal or shared use)

The identification information (e.g., the serial number) of the image forming apparatus 230 may be received along with the operation-related information, or may be determined from a host name or an IP address indicated by a received packet. Other apparatus information may be received along with the operation-related information, or may be obtained from a database in which identification information and apparatus information are mapped to each other.

As described above, the user preference information is obtained during the initial setup period of the image forming apparatus 230, and is transmitted from the image forming apparatus 230 to the server apparatus 260. On the other hand, the operation history information and the environmental condition information are repeatedly (e.g., periodically) transmitted from the image forming apparatus 230 to the server apparatus 26 while the image forming apparatus 230 is operating. The information retaining unit 370 may aggregate values of each information item in the operation history information for each apparatus, and retain the aggregated results. Below, Table 3 indicates an example of the user preference information retained by the information retaining unit 370, and Table 4 indicates an example of the operation history information retained by the information retaining unit 370.

TABLE 3

Example of User Preference Information Retained in Server

| Ser. No. | Image Quality | Quietness | . . . | Energy Savings |
|---|---|---|---|---|
| 1,234,567 | 2 | 5 | . . . | 6 |
| 1,234,568 | 9 | 4 | . . . | 4 |
| 1,234,569 | 9 | 9 | . . . | 1 |

TABLE 4

Example of Operation History Information Retained in Server

| Ser. No. | Number of Printouts per Paper Size | | | Number of Printouts per Paper Type | | | ... | Number of Printouts per Printing Ratio Range | | ... |
|---|---|---|---|---|---|---|---|---|---|---|
| | A4 | A3 | ... | Standard | Glossy | ... | ... | 0-1% | 1-2% | ... |
| 1,234,567 | 0 | 100 | ... | 98 | 2 | ... | ... | 50 | 40 | ... |
| 1,234,568 | 150 | 10 | ... | 160 | 0 | ... | ... | 20 | 100 | ... |
| 1,234,569 | 0 | 0 | ... | 0 | 30 | ... | ... | 0 | 5 | ... |

In the example indicated by Table 3, the user preference information expressing the user's preferences with respect to a plurality of performance indicators is retained in association with the serial number of the apparatus from which the information has been transmitted In the example indicated by Table 4, the operation history information, which is aggregated from the history of image forming operations, is retained in association with the serial number of the apparatus from which the information has been transmitted. When new operation history information has been received from the image forming apparatus 230, the information retaining unit 370 can update the operation history information so as to reflect the newly-received information. The environmental condition information and the analysis result information may be retained in the same manner. Note that the information retaining unit 370 may retain the apparatus information, the user preference information, the operation history information, the environmental condition information, and the analysis result information in separate tables, or may retain some or all of that information in an integrated table.

In a case where an image forming apparatus is newly used in the image forming system 1, the carryover unit 380 carries over, to the new image forming apparatus, information, among the operation-related information which has been obtained by existing apparatuses, that is related to operations of an image forming unit of the new image forming apparatus. The "case where an image forming apparatus is newly used" mentioned here is assumed to include both a case in which an existing apparatus is replaced with a new apparatus, and a case in which a new apparatus is introduced in addition to an existing apparatus.

Here, for descriptive purposes, it is assumed that an image forming apparatus 230A in the image forming system 1 is replaced with an image forming apparatus 230B which is being newly introduced. A user of the image forming system 1 can, through a screen of the user terminal 200 or the image forming apparatus 230B, designate the image forming apparatus 230A as an information carryover source and make a request, to the server apparatus 260, to carry over the operation-related information. FIG. 6 is a diagram illustrating an example of a GUI for designating an information carryover source apparatus. A carryover request window 600 illustrated in FIG. 6 includes: a checkbox 601 for designating whether or not to request the operation-related information to be carried over; an input field 602 for inputting the identification information of the carryover source apparatus; and an input field 603 for inputting a password. By selecting "yes" in the checkbox 601, entering the serial number of the image forming apparatus 230A in the input field 602, and entering a predetermined password in the input field 603, the user can request the operation-related information of the image forming apparatus 230A to be carried over. Note that if the input is performed through the screen of the user terminal 200, an identification number of the information carryover destination (e.g., the serial number of the image forming apparatus 230B) can also be entered. The carryover unit 380 commences the carryover of the operation-related information between the designated apparatuses in response to receiving the information carryover request generated in this manner.

When the functions, configurations, and uses of the image forming apparatus 230A and the image forming apparatus 230B are substantially equivalent, the operation-related information of the image forming apparatus 230A retained by the information retaining unit 370 can be carried over to the image forming apparatus 230B as-is. However, if the functions, configurations, or uses of these apparatuses are different, it may not be possible to carry over the operation-related information of the image forming apparatus 230A to the image forming apparatus 230B as-is. Accordingly, by comparing the apparatus information of the image forming apparatus 230A and the apparatus information of the image forming apparatus 230B, the carryover unit 380 selects which information, among the operation-related information of the image forming apparatus 230A, should be carried over to the image forming apparatus 230B. Here, the "apparatus information" is information pertaining to the function, configuration, and use of the corresponding apparatus, and can include at least one of the supported paper size, function type, model number, date of manufacture, and usage type mentioned as examples above. For example, when the image forming apparatus 230A has a function for adjusting the printing speed, but the image forming apparatus 230B has no such function, the carryover unit 380 may exclude, from the carryover information, information items used for adjusting the printing speed.

To describe this in terms of the user preference information, the image forming apparatus 230A uses the user preference information obtained from the user through the GUI illustrated in FIG. 4 to adjust or set the operations of an image forming unit of the image forming apparatus 230A. The image forming apparatus 230B uses the user preference information carried over from the image forming apparatus 230A via the carryover unit 380 to adjust or set the operations of the image forming unit of the image forming apparatus 230B. This reduces the burden on the user involved in entering the preference information.

In a case where fewer information items of the user preference information are included in the carryover information than information items which can be used to adjust operations of the image forming apparatus 230B, the image forming apparatus 230B may request that the user inputs additional user preference information through the UI. FIG. 7 is a diagram illustrating an example of a GUI for accepting such additional input of user preference information. Comparing an input window 700 illustrated in FIG. 7 with the input window 400 illustrated in FIG. 4, questions pertaining to the user's preferences which are figured out from the carryover information have been disabled, and only options for answering a new question Q7 are made selectable. This is because, for example, the image forming apparatus 230A does not support the adjustment of operations pertaining to FPOT, but the image forming apparatus 230B does support the adjustment of operations pertaining to FPOT. For example, if the user selects option a71 in response to question Q7, the image forming apparatus 230B can assign a higher value to the preference score for the first output time than when option a72 is selected. The preference scores for image quality, quietness, productivity, apparatus lifetime, and energy-saving performance can be carried over from the image forming apparatus 230A by the carryover unit 380 without requiring any interaction with the user.

The carryover unit 380 may select carryover information, among the operation-related information, to be carried over to the image forming apparatus 230B in accordance with a predefined criterion for each information item of the operation-related information. Specifically, some information items in the operation-related information retained by the server apparatus 260 can be predefined as items to be excluded from the carryover. For example, the remaining lifetime of the apparatus, which was described above as an example of the analysis result information, should be initialized for the new apparatus, and is therefore excluded from being carried over. Some information items may be predefined so that those items are always included as items to be carried over. For example, if the operating environment is the same, the environmental condition information may be included as an item to be carried over regardless of the function, configuration, and use of the apparatus. Other information items can be carried over conditionally on the basis of the comparison of the apparatus information. For example, information items pertaining to paper size (e.g., the number of printouts by paper size) may be carried over between A4-capable apparatuses and between A3-capable apparatuses, but may be excluded from being carried over between an A4-capable apparatus and an A3-capable apparatus. Information items pertaining to paper size and information items pertaining to paper type may be carried over between SFPs and between MFPs, but may be excluded from being carried over between an SFP and an MFP. The same applies to information items pertaining to the average printing ratio. Information items pertaining to the number of printouts may, for example, be carried over between apparatuses for personal use and between apparatuses for shared use, but may be excluded from being carried over between an apparatus for personal use and an apparatus for shared use.

2-4. Flow of Processing (1) Basic Processing of Image Forming Apparatus

Figure 8:
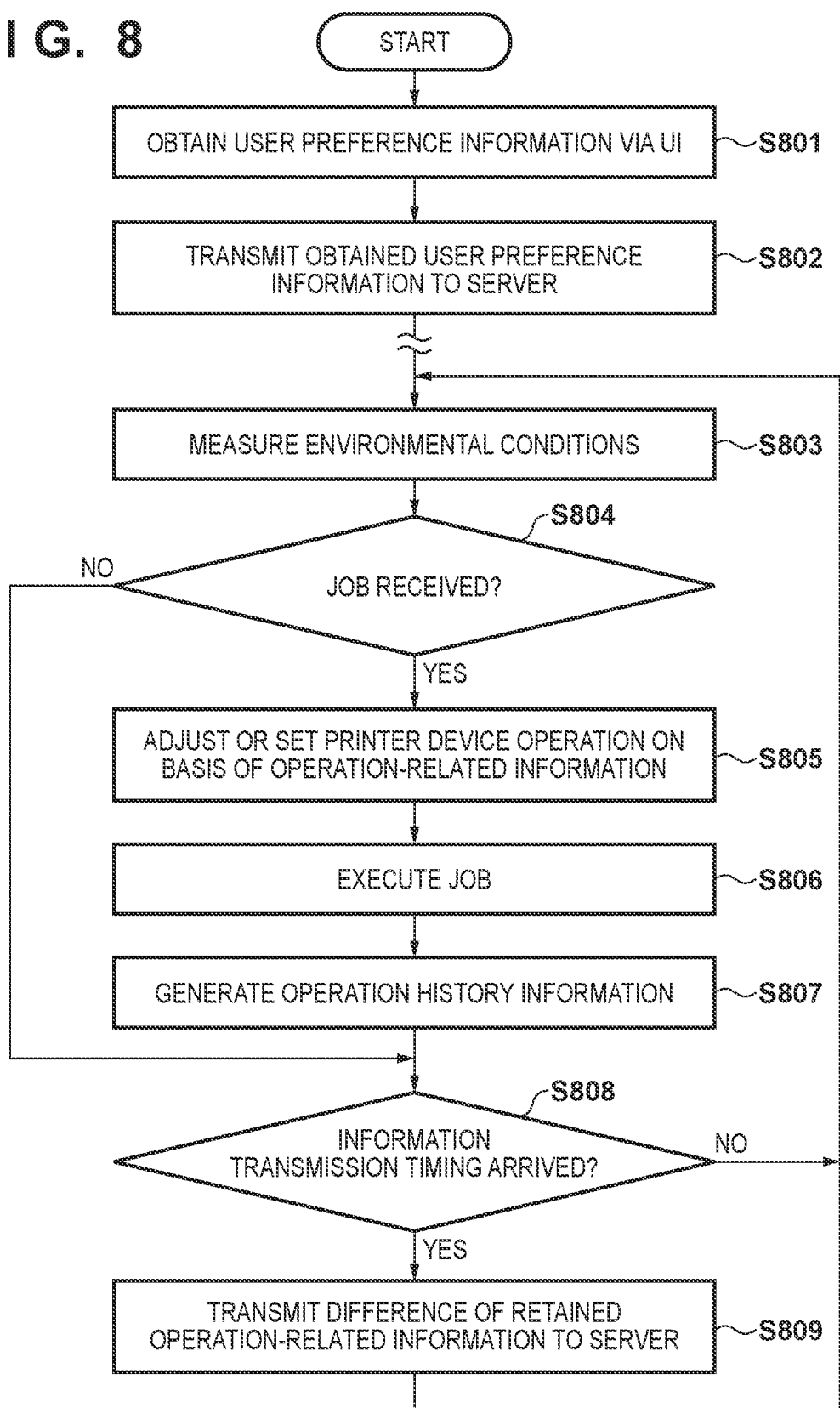
FIG. 8 is a flowchart illustrating an example of the basic flow of processing executed by the image forming apparatus.

FIG. 8 is a flowchart illustrating an example of the basic flow of processing executed by the image forming apparatus 230 according to the present embodiment. The processing illustrated in FIG. 8 can be realized by, for example, the CPU 242 executing a computer program loaded into the RAM 244 from the HDD 245. Note that in the following descriptions, the processing steps may be indicated by an S, indicating "step".

It is assumed here that the image forming apparatus 230A is introduced into the image forming system 1, but there is no other existing apparatus and as such, the operation-related information is not carried over. First, during the initial setup period of the apparatus, in step S801, the user preference obtaining unit 310 obtains, via a UI, the user preference information expressing the user's preferences with respect to one or more performance indicators of the image forming operations. The user preference information obtained here is retained in the information retaining unit 325 as part of the operation-related information (e.g., the information is stored in the HDD 245). Next, in step S802, the communication unit 340 transmits the user preference information of the image forming apparatus 230A to the server apparatus 26 along with the identification information (e.g., the serial number) of the image forming apparatus 230A. Then, once the initial setup is complete, the image forming apparatus 230A enters a standby state of standing by for the print job.

In step S803, the environmental condition obtaining unit 320 obtains the environmental condition information by measuring the operating environment and the environmental conditions of the image forming apparatus 230 using, for example, sensors such as a temperature sensor and a humidity sensor. Typically, the environmental condition information can be obtained periodically. The environmental condition information obtained here is retained by the information retaining unit 325 as part of the operation-related information. The information retaining unit 325 may retain the environmental condition information obtained by the environmental condition obtaining unit 320 as-is, or may retain a result of subjecting the information to some kind of aggregation processing or statistical processing. The environmental condition information is stored in the HDD 245, for example.

In step S804, the job control unit 335 determines whether a print job has been received. The sequence moves to step S805 if a print job has been received. Meanwhile, the sequence moves to step S808 if a print job has not been received.

In step S805, on the basis of the operation-related information retained in the information retaining unit 325, the operation adjusting unit 330 adjusts or sets the image forming operations of the printer device 100. A sufficient amount of the operation-related information has not yet been accumulated in the period shortly after the introduction of the apparatus, and thus if there is no carryover information, optimal operations may not necessarily be achieved as a result of making adjustments or settings here. The operations can be optimized after a certain amount of time has passed and a sufficient amount of the operation-related information has been accumulated. Although FIG. 8 illustrates an example in which the image forming operations are adjusted or set in response to a print job being received, it should be noted that the image forming operations may be adjusted or set at a different timing.

Next, in step S806, the job control unit 335 executes the received print job. For example, the job control unit 335 controls the printer device 100 via the printer engine 250 so that an image for printing is formed on the size and type of paper designated in the job, for a number of copies designated in the job. Next, the history obtaining unit 315 generates the operation history information for the executed job. The operation history information generated here is retained by the information retaining unit 325 as part of the operation-related information. The information retaining unit 325 may retain the operation history information generated by the history obtaining unit 315 as-is, or may retain a result of subjecting the information to some kind of aggregation processing or statistical processing. The operation history information is stored in the HDD 245, for example.

Next, in step S808, the communication unit 340 determines whether or not a timing to transmit the operation-related information to the server apparatus 260 has arrived. The sequence returns to step S803 if the timing to transmit the information has not arrived. Meanwhile, if it is determined that the time to transmit the information has arrived, in step S809, the communication unit 340 transmits the operation-related information retained by the information retaining unit 325 in a differential manner to the server apparatus 260 along with the identification information of the image forming apparatus 230A aside from the information which has already been transmitted. The sequence then returns to step S803. Steps S803 to S809 can be repeated as long as the image forming apparatus 230A is operating.

(2) Processing of Server Apparatus

Figure 9:
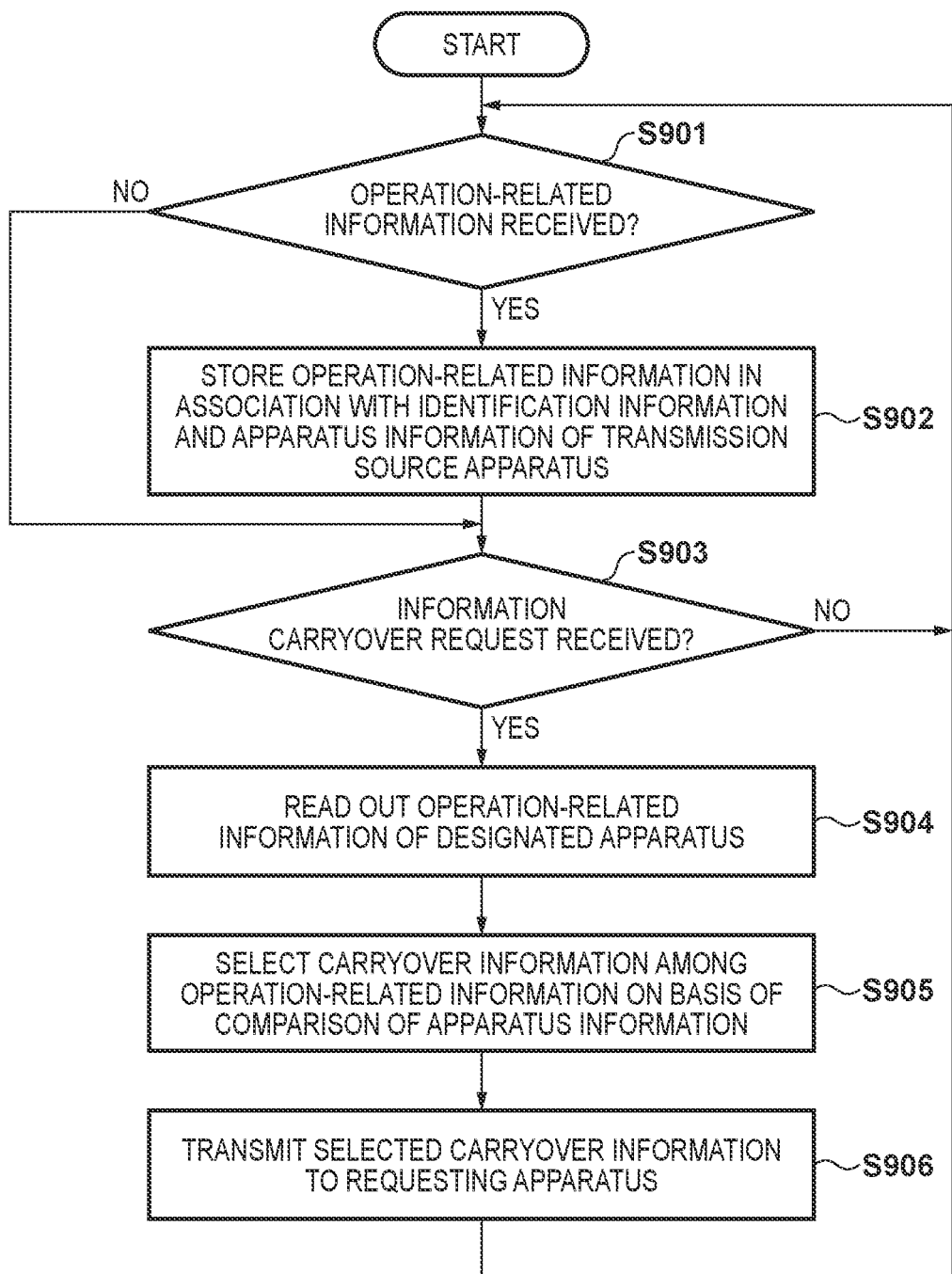
FIG. 9 is a flowchart illustrating an example of the flow of processing executed by the server apparatus.

FIG. 9 is a flowchart illustrating an example of the flow of processing executed by the server apparatus 260 according to the present embodiment. The processing illustrated in FIG. 9 can be realized by, for example, a CPU of the server apparatus 260 executing a computer program loaded into the RAM from the HDD.

First, in step S901, the communication unit 360 stands by to receive the operation-related information from an apparatus in the system. The sequence moves to step S902 once the operation-related information has been received. Meanwhile, the sequence moves to step S903 if the operation-related information is not received.

For example, if the operation-related information has been received from the image forming apparatus 230A in step S901, in step S902, the information retaining unit 370 stores the operation-related information of the image forming apparatus 230A in storage in association with the identification information and the apparatus information of the image forming apparatus 230A. The information retaining unit 370 may store the received operation-related information as-is, or may store a result of subjecting the information to some kind of aggregation processing or statistical processing.

In step S903, the communication unit 360 stands by for an information carryover request from an apparatus that is to be newly used. The sequence moves to step S904 once the information carryover request is received. The standby for the operation-related information in step S901 and the standby for the information carryover request in step S903 may be performed substantially in parallel.

For example, if, in step S903, an information carryover request specifying the image forming apparatus 230A as the carryover source apparatus has been received from the image forming apparatus 230B, in step S904, the carryover unit 380 reads out the operation-related information from the storage of the image forming apparatus 230A. Then, in step S905, on the basis of a comparison of the apparatus information of the image forming apparatus 230A with the apparatus information of the image forming apparatus 230B, the carryover unit 380 selects the carryover information, among the read-out operation-related information, which is to be carried over to the image forming apparatus 230B. Next, in step S906, the communication unit 360 transmits the carryover information selected by the carryover unit 380 to the image forming apparatus 230B.

In the selection of the carryover information performed in step S905, some information items may be included in the carryover information regardless of the result of the apparatus information comparison. For example, in a case where an apparatus is being replaced in the same operating environment, the environmental condition information and the analysis result information based on the environmental condition information can always be included in the carryover information. Additionally, some information items may be excluded from the carryover information regardless of the apparatus information comparison. For example, the remaining lifetime of the apparatus can always be excluded from the carryover information. Other operation-related information may be included in or excluded from the carryover information on the basis of the apparatus information comparison. The following Table 5 indicates an example of the comparison of the apparatus information when the image forming apparatus 230B is the carryover target apparatus from the image forming apparatus 230A. Here, the serial number of the image forming apparatus 230A is "1234567" and the serial number of the image forming apparatus 230B is "1234568".

TABLE 5

Example of Comparison of Apparatus Information
When Replacing with Carryover Target Apparatus

| Ser. No. | Supported Paper Size | Function Type | Model Number | Date of Manufacture |
|---|---|---|---|---|
| 1,234,567 | A4 | SFP | A1000 | 2017 Mar. 19 |
| 1,234,568 | A4 | SFP | A1100 | 2018 Oct. 20 |

In a case of replacement with a carryover target apparatus, such as the example indicated in Table 5, the information items in the operation history information which pertain to the paper size and the average printing ratio can be included in the carryover information. However, which information items are to be carried over is not limited by the above example and may be defined in any fashion in connection with what relationship the apparatus information of two apparatuses is in.

(3) Obtainment of Carryover Information

Figure 10:
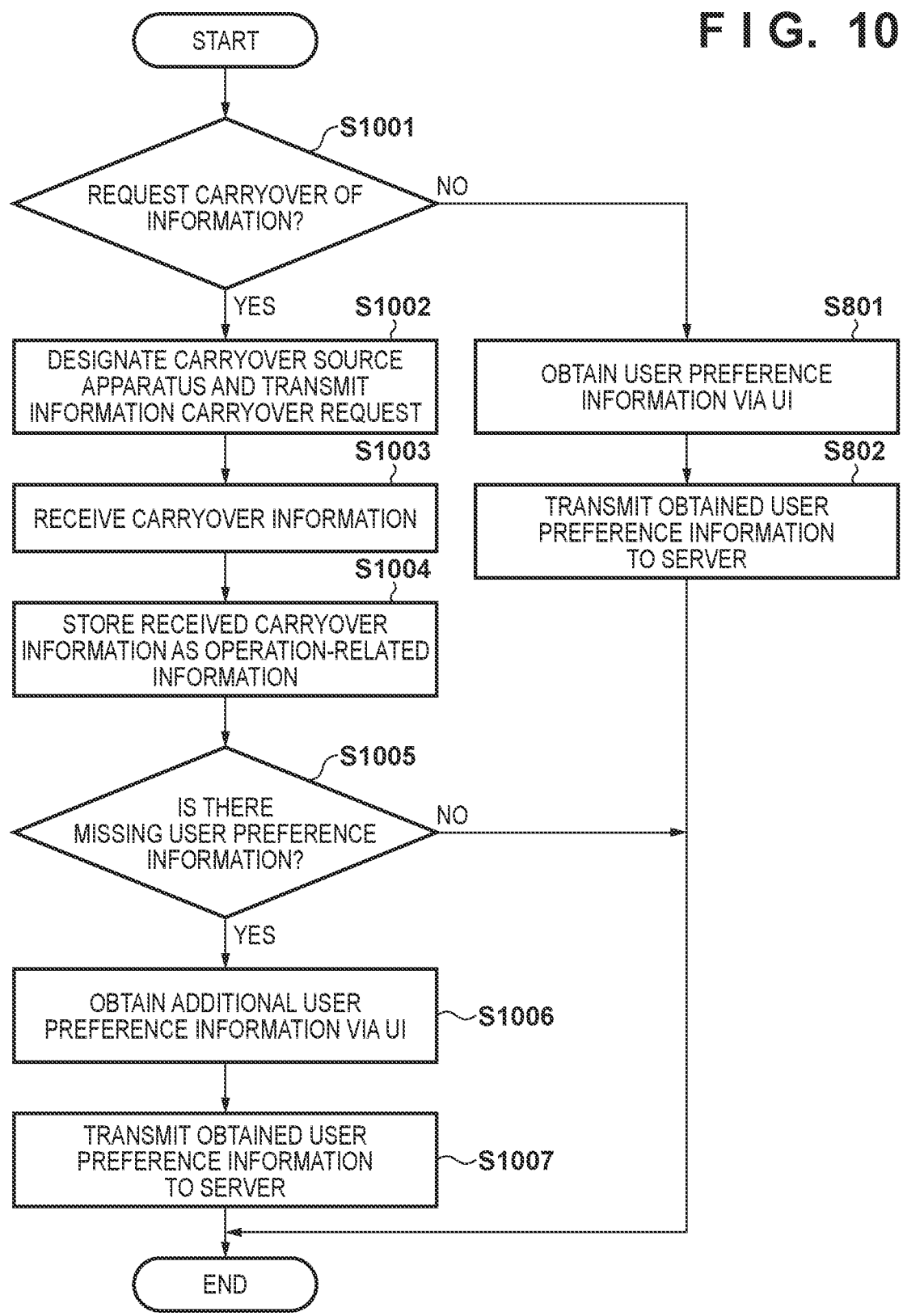
FIG. 10 is a flowchart illustrating an example of the flow of carryover information obtainment processing executed by the image forming apparatus.

FIG. 10 is a flowchart illustrating an example of the flow of processing for carrying over the operation-related information, executed by the image forming apparatus 230 according to the present embodiment during initial setup. The processing illustrated in FIG. 10 can be realized by, for example, the CPU 242 executing a computer program loaded into the RAM 244 from the HDD 245.

Here, it is assumed that the operation-related information of the image forming apparatus 230A is carried over to the image forming apparatus 230B from the server apparatus 260.

First, during the initial setup period of the apparatus, in step S1001, the information retaining unit 325 causes the carryover request window 600, illustrated in FIG. 6, to be displayed in the screen, and determines whether or not to request a carryover of operation-related information on the basis of a user input. Here, if a user input indicates that a request for carryover of operation-related information is not to be made, steps S801 and S802, described with reference to FIG. 8, are executed. Meanwhile, if a user input indicates that a request for carryover of operation-related information is to be made, the sequence moves to step S1002.

In step S1002, the communication unit 340 transmits an information carryover request to the server apparatus 260. The information carryover request transmitted here can include the identification information of the image forming apparatus 230A, which is the carryover source apparatus, and the identification information of the image forming apparatus 230B, which is the request source (carryover destination) apparatus. The information carryover request can further include authentication information including a password. Next, in step S1003, the communication unit 340 receives the carryover information provided from the server apparatus 260 in response to the information carryover request. Then, in step S1004, the information retaining unit 325 stores the carryover information received from the server apparatus 260 in the HDD 245 as the operation-related information to be used to adjust or set the operations of the printer device 100 of the image forming apparatus 230B.

Next, in step S1005, the information retaining unit 325 determines whether or not there are information items missing from the user preference information included in the carryover information with respect to the information items which can be used to adjust the operations of the image forming apparatus 230B. If there is a missing information item, in step S1006, the user preference obtaining unit 310 obtains additional user preference information through a UI such as the input window 700 illustrated in FIG. 7. For example, if the image forming apparatus 230A does not collect a preference score for the first output time, but the image forming apparatus 230B can adjust its operations based on a preference score pertaining to the first output time, additional user preference information pertaining to the first output time may be obtained. Then, in step S1007, the communication unit 340 transmits the obtained user preference information to the server apparatus 260 along with the identification information of the image forming apparatus 230B.

The image forming apparatus 230B then completes the initial setup and enters the standby state. The processing executed by the image forming apparatus 230B after the initial setup is complete may be the same as the processing described as steps S803 to S809 in FIG. 8.

3. Variation Example

In the embodiment described above, there is only one user in the image forming system 1, or the system makes no distinction between multiple users that can exist. In contrast, in a variation example described in this section, users are identified individually and it is made possible to carry over operation-related information on a user-by-user basis. Additionally, in the present variation example, operation-related information collected by a plurality of apparatuses can be comprehensively carried over to a single apparatus.

3-1. Overall Configuration

Figure 11:
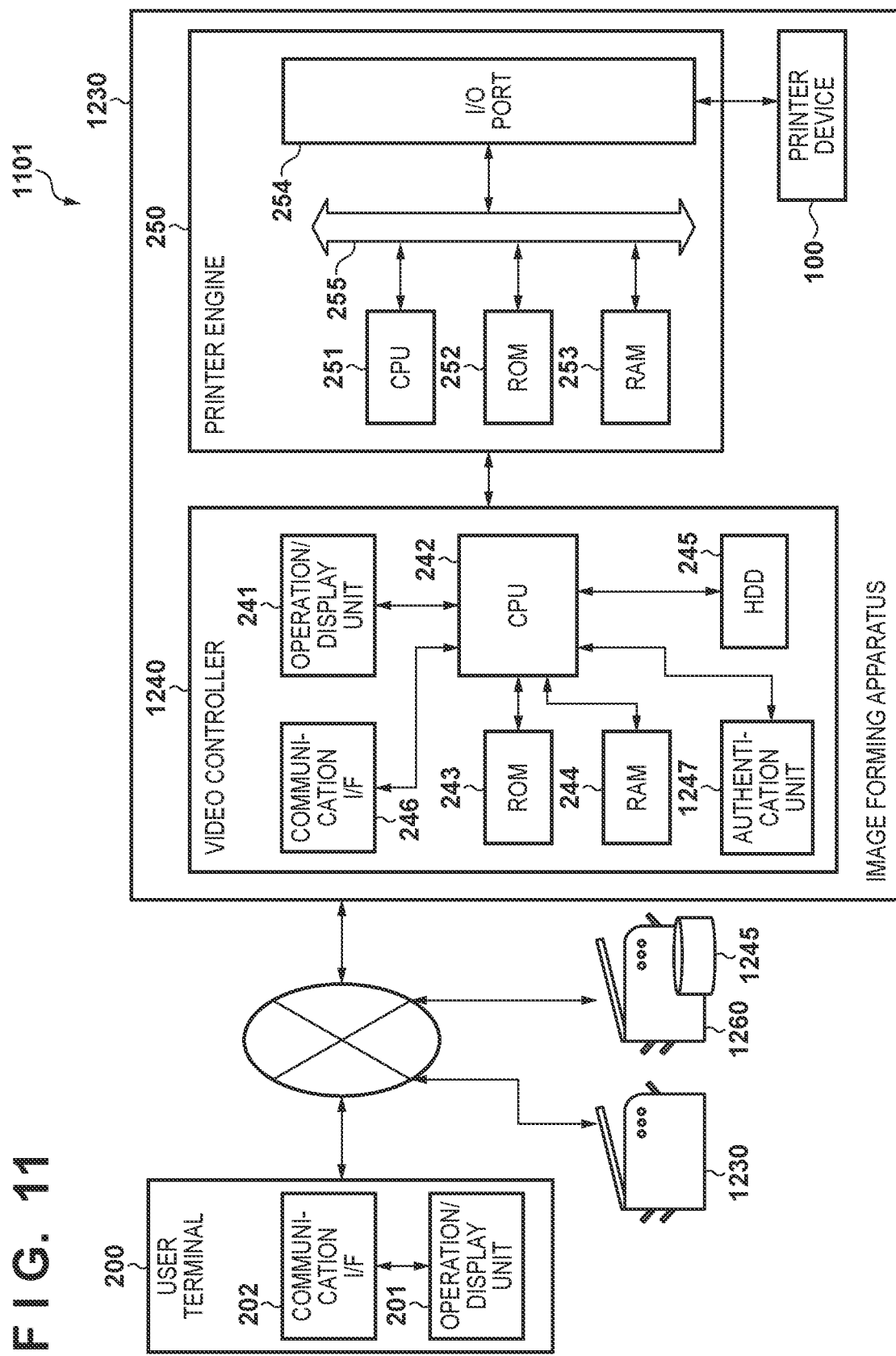
FIG. 11 is a schematic diagram illustrating an example of the configuration of an image forming system according to a variation example.

FIG. 11 is a schematic diagram illustrating an example of the configuration of an image forming system 1101 according to the variation example. As illustrated in FIG. 11, the image forming system 1101 includes the user terminal 200, a plurality of image forming apparatuses 1230, and an image forming apparatus 1260.

Like the above-described image forming apparatus 230, each of the image forming apparatuses 1230 and the image forming apparatus 1260 includes the printer device 100 as an image forming unit. However, in the present variation example, a video controller 1240 of each of these apparatuses additionally includes an authentication unit 1247. The authentication unit 1247 is a device that authenticates users, and may be an IC card reader or an RF tag reader, an ID/password authentication module, or the like, for example. For example, when a user who will use the image forming apparatus 1230 brings an IC card in their possession close to the authentication unit 1247 of the image forming apparatus 1230, the authentication unit 1247 reads identification information of the user (e.g., a user ID) which is preregistered in the IC card.

In the present variation example, the image forming apparatus 126 has a server function for centrally managing operation-related information collected by a plurality of apparatuses in the image forming system 1101, in the same manner as the server apparatus 260 described above. To that end, an HDD 1245 of the image forming apparatus 1260 has a greater storage capacity than the HDD 245 of the image forming apparatus 1230. The image forming apparatus 1260 is also called a "center machine". Aside from the server function, the functions of the image forming apparatus 1260 of the same as the functions of the image forming apparatuses 1230.

3-2. Configuration of Image Forming Apparatuses

Figure 12:
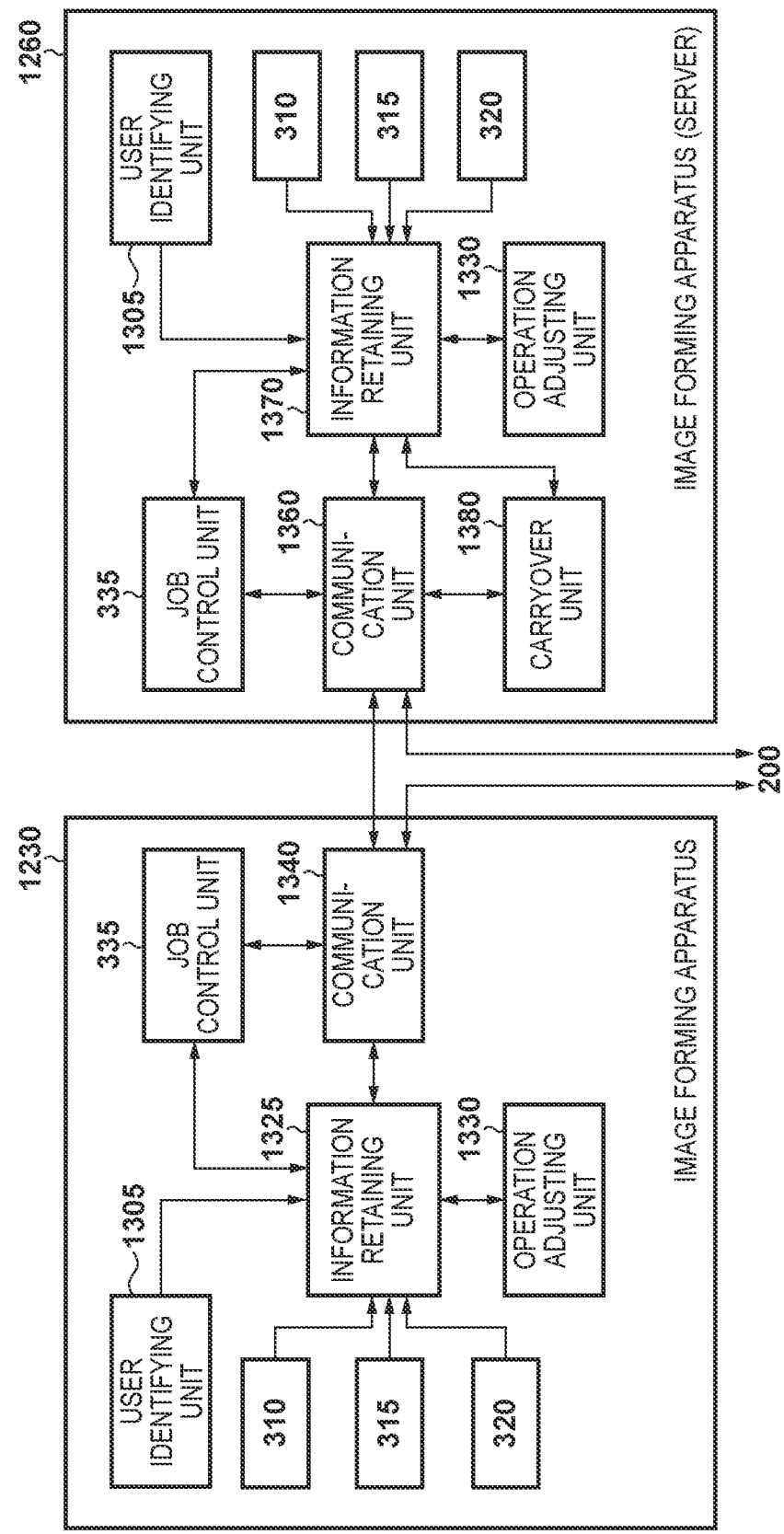
FIG. 12 is a block diagram illustrating an example of the functional configuration of image forming apparatuses illustrated in FIG. 11.

FIG. 12 is a block diagram illustrating an example of the functional configuration of the image forming apparatuses 1230 and the image forming apparatus 1260 illustrated in FIG. 11. As illustrated in FIG. 12, the image forming apparatus 1230 includes a user identifying unit 1305, the user preference obtaining unit 310, the history obtaining unit 315, the environmental condition obtaining unit 320, an information retaining unit 1325, an operation adjusting unit 1330, the job control unit 335, and a communication unit 1340.

The user identifying unit 1305 uses the authentication unit 1247 to identify the user who uses the image forming apparatus 1230. The user identifying unit 1305 then associates user identification information of the identified user with operation-related information collected by the information retaining unit 1325.

Like the above-described information retaining unit 325, the information retaining unit 1325 retains the operation-related information pertaining to operations of the printer device 100 by storing the information in the HDD 245, for example. The operation-related information can include the user preference information input from the user preference obtaining unit 310, the operation history information input from the history obtaining unit 315, and the environmental condition information input from the environmental condition obtaining unit 320. In the present variation example, the information retaining unit 1325 may, for example, retain the user preference information in association with the user identification information of the user that entered the user preference information. Additionally, the information retaining unit 1325 may retain the operation history information in association with the user identification information of the user that issued a print job which has been executed. The environmental condition information may be retained as information which is common for a plurality of users.

Using the operation-related information retained in the information retaining unit 1325, the operation adjusting unit 1330 adjusts or sets the image forming operations of the printer device 100. For example, in the present variation example, the user identifying unit 1305 outputs, to the operation adjusting unit 1330, the user identification information of the user who is attempting to use the apparatus at the present time. The operation adjusting unit 1330 obtains, from the information retaining unit 1325, the operation-related information associated with the user identification information input from the user identifying unit 1305. The operation adjusting unit 1330 may use the obtained operation-related information to adjust or set a variety of operation parameters of the printer device 100. The method by which the operation adjusting unit 1330 adjusts or sets the individual operation parameters may be the same as a method described above with reference to the operation adjusting unit 330.

In the present variation example, like the above-described communication unit 340, the communication unit 1340 receives a print job from the user terminal 200, and transmits the progress and an execution result of the print job to the user terminal 200. Additionally, the communication unit 1340 transmits the operation-related information of the image forming apparatus 1230, which is retained by the information retaining unit 1325, to the image forming apparatus 1260. The transmission of the operation-related information to the image forming apparatus 1260 may be performed periodically (e.g., once a day), or each time the information has been updated. Moreover, the communication unit 1340 transmits the operation-related information to the image forming apparatus 1260 along with the user identification information associated with the operation-related information. One or both of the identification information identifying the image forming apparatus 1230 and the apparatus information may furthermore be added to the information which is transmitted.

When the use of the image forming apparatus 1230 is newly started, the communication unit 1340 can receive, from the image forming apparatus 1260, carryover information which has been selected by the image forming apparatus 1260 from operation-related information already collected by existing apparatuses. Upon receiving the carryover information, the communication unit 1340 outputs the received carryover information to the information retaining unit 1325. The information retaining unit 1325 stores the carryover information in the HDD 245 as operation-related information. In the present variation example, the operation-related information carried over in this manner can be information associated with specific instance of user identification information. Even immediately after the use has been newly started, the operation adjusting unit 1330 can adjust the image forming operations of the printer device 100 to fit the preferences of a specific user, by using the carryover information provided from an existing apparatus and retained in the information retaining unit 1325.

3-3. Functions of Center Machine

As illustrated in FIG. 12, the image forming apparatus 1260 includes the user identifying unit 1305, the user preference obtaining unit 310, the history obtaining unit 315, the environmental condition obtaining unit 320, the operation adjusting unit 1330, the job control unit 335, a communication unit 1360, an information retaining unit 1370, and a carryover unit 1380.

The communication unit 1360 receives, from the communication unit 1340 of the image forming apparatus 1230, the operation-related information associated with the user identification information as described above. The communication unit 1360 outputs the received operation-related information to the information retaining unit 1370. Additionally, when an apparatus starts being newly used in the image forming system 1101, the communication unit 1360 transmits, to the new apparatus, carryover information selected by the carryover unit 1380 as described later, from operation-related information already collected in the past by existing apparatuses. The carryover information can be provided to the new apparatus in accordance with, for example, an information carryover request which may be received from the new apparatus.

The information retaining unit 1370 centrally retains the operation-related information collected by the image forming apparatuses 1230 and the image forming apparatus 1260. Moreover, in the present variation example, the information retaining unit 1370 retains the operation-related information in association with the user identification information. The operation-related information may furthermore be associated with identification information and apparatus information of an apparatus that obtained the operation-related information.

In the present variation example, the information retaining unit 1370 can manage the user identification information of the users who use the image forming system 1101. The user identification information is assumed to be a user ID here. The user ID may be registered individually by each user, or may be preregistered collectively by a manager or engineer who administers system operation. The user ID may be registered through a UI displayed in a screen of the user terminal 200, the image forming apparatus 1230, or the image forming apparatus 1260, or may be preregistered in storage or a database without using a UI.

Each user may attempt authentication using the authentication unit 1247 of any one of the image forming apparatuses, and log into the image forming system 1101 in the event that the authentication is successful. If the user preference information of a user who has logged in has not yet been obtained, the information retaining unit 1370 may cause a UI, such as the input window 400 illustrated in FIG. 4, to be displayed in the screen of the apparatus in which the authentication is being performed, and may cause the user preference obtaining unit 310 of that apparatus to obtain the user preference information. The user preference information obtained in this manner is then transferred to the information retaining unit 1370 along with the user ID of the user who has logged in, and is retained by the information retaining unit 1370 in association with the user ID. Table 6 indicates an example of the user preference information retained by the information retaining unit 1370.

TABLE 6

Example of User Preference Information Retained on User-by-User Basis

| User ID | Image Quality | Quietness | . . . | Energy Savings |
|---------|---------------|-----------|-------|----------------|
| ABC1000 | 2 | 5 | . . . | 6 |
| DEF1000 | 9 | 4 | . . . | 4 |
| GHI1000 | — | — | . . . | — |

Likewise, the information retaining unit 1370 can retain the operation history information in association with the user ID. The method for obtaining the operation history information may be the same as in the example described above, except that the operation history information is obtained along with a user ID of a user who issued a print job. Table 7 indicates an example of the operation history information retained by the information retaining unit 1370.

TABLE 7

Example of Operation History Information Retained on User-by-User Basis

| | Number of Printouts per Paper Size | | | Number of Printouts per Paper Type | | | ... | Number of Printouts per Printing Ratio Range | | |
|---|---|---|---|---|---|---|---|---|---|---|
| User ID | A4 | A3 | ... | Standard | Glossy | ...... | | 0-1% | 1-2% | ... |
| ABC1000 | 0 | 100 | ... | 98 | 2 | ...... | | 50 | 40 | ... |
| DEF1000 | 150 | 10 | ... | 160 | 0 | ...... | | 20 | 100 | ... |
| GHI1000 | — | — | ... | — | — | ...... | | — | — | ... |

Table 8 indicates an example of the operation history information retained in association with the apparatus identification information and the user identification information. Here, the apparatus identification information is a serial number, and the user identification information is the user ID.

TABLE 8

Example of Operation History Information Retained on Apparatus-by-Apparatus and User-by-User Basis

| | | Number of Printouts per Paper Size | | | Number of Printouts per Paper Type | | | ... | Number of Printouts per Printing Ratio Range | | |
|---|---|---|---|---|---|---|---|---|---|---|---|
| Ser. No. | User ID | A4 | A3 | ... | Standard | Glossy | ...... | | 0-1% | 1-2% | ... |
| 1,234,567 | ABC1000 | 0 | 100 | ... | 98 | 2 | ...... | | 50 | 40 | ... |
| | DEF1000 | 150 | 10 | ... | 160 | 0 | ...... | | 20 | 100 | ... |
| | GHI1000 | — | — | ... | — | — | ...... | | — | — | ... |
| 1,234,568 | ABC1000 | 0 | 10 | ... | 10 | 0 | ...... | | 40 | 40 | ... |
| | JKL2000 | 100 | 20 | ... | 120 | 10 | ...... | | 10 | 90 | ... |
| | MNO2000 | — | — | ... | — | — | ...... | | — | — | ... |
| 1,234,569 | JKL2000 | 10 | 0 | ... | 5 | 5 | ...... | | 10 | 80 | ... |
| | PQR3000 | — | — | ... | — | — | ...... | | — | — | ... |

Note that processing for aggregating values of the information items of the operation history at job level (e.g., the paper size and the number of printouts) into combination values (e.g., the number of printouts per paper size) may be performed by any one of the individual image forming apparatuses 1230 and the image forming apparatus 1260 serving as the center machine.

The carryover unit 1380 carries over operation-related information out of the information obtained in the past by a certain image forming apparatus 1230 to another image forming apparatuses 1230, where the carried over information pertains to the operations of an image forming unit of that other image forming apparatus 1230. This kind of carryover may be performed in a case where an existing apparatus is replaced with a new apparatus, a case where a new apparatus is added to the system in addition to the existing apparatus, and a case where a user uses a specific apparatus for the first time.

For ease of explanation, it is assumed here that an image forming apparatus 1230C is newly used in the image forming system 1101, and that before that use, one or more image forming apparatuses 1230 were already present. In the present variation example, out of the operation-related information obtained by one or more of the existing image forming apparatuses, the carryover unit 1380 carries over, to the image forming apparatus 1230C, information to be used to adjust or set the image forming operations of the image forming apparatus 1230C. More specifically, out of the operation-related information centrally retained by the information retaining unit 1370, the carryover unit 1380 selects, as the carryover information to be carried over to the image forming apparatus 1230C, information associated with the user identification information of the user who will use the image forming apparatus 1230C.

For example, assume that in a situation where the operation history information indicated in Table 8 has already been accumulated, a user identified by the user ID "ABC1000" has logged into the image forming apparatus 1230C identified by the serial number "1234569". In this case, the carryover unit 1380 extracts, from the information retaining unit 1370, two records of the operation history information associated with the user ID "ABC1000" as indicated in the following Table 9, and includes the extracted information in the carryover information. Note that the carryover unit 1380 may first total the values of the information items indicated by the two records and then include those totals in the carryover information. Additionally, such calculations may be performed by the image forming apparatus 1230C which receives the carryover information, rather than the center machine.

TABLE 9

Example of Carry over Information per User

| Ser. No. | User ID | Number of Printouts per Paper Size | | | Number of Printouts per Paper Type | | | Number of Printouts per Printing Ratio Range | | |
|---|---|---|---|---|---|---|---|---|---|---|
| | | A4 | A3 | ... | Standard | Glossy | ...... | 0-1% | 1-2% | ... |
| 1,234,567 | ABC1000 | 0 | 100 | ... | 98 | 2 | ...... | 50 | 40 | ... |
| 1,234,568 | ABC1000 | 0 | 10 | ... | 10 | 0 | ...... | 40 | 40 | ... |

Note that in the present variation example too, the user may make a request to the image forming apparatus 1260 for carryover of the operation-related information by designating one or more information carryover sources in the screen of the user terminal 200 or the image forming apparatus 1230C. In this case, it is possible to include only the operation-related information already collected in the past by the designated apparatus in the carryover information.

As described above with respect to the carryover unit 380, also in the present variation example, the operation-related information can be carried over as-is when the functions, configurations, and uses of the carryover source and carryover destination apparatuses are substantially the same. Meanwhile, when the functions, configurations, and uses of these apparatuses are different, only some of the information items, selected on the basis of the comparison between the apparatus information of the apparatuses, may be included in the carryover information. Information items of the user preference information which are missing in the carryover information may be obtained additionally through a UI such as the input window 700 illustrated in FIG. 7. Also in the present variation example, which information of the operation-related information is to be carried over may be determined in accordance with a predefined criterion for each information item in the operation-related information.

Focusing on the above-described example of adjusting the preheating of the fixing roller 14, whether to place more importance on image quality or energy-saving performance may differ depending on a user. Likewise, the frequency of prints made onto large-sized paper may also differ depending on a user. As such, identifying which user has logged into the image forming apparatus 1230C and then carrying over the operation-related information associated with the identified user to the image forming apparatus 1230C can ensure that the image forming operations of the image forming apparatus 1230C are optimal for that user. In the example indicated in Table 9, with reference to the number of printouts per paper size for the user having the user ID "ABC1000", the number of printouts for A3-sized paper is much larger than for other sizes. In this case, adjusting the preheating time of the fixing roller 14 to be relatively longer, or adjusting the target temperature for the preheating to be relatively higher, can provide a printing result having the optimal image quality for that user. Then, in the present variation example, such preferences or tendencies of the user are carried over between apparatuses, which makes it possible to provide image forming operations suited to that user without re-collecting information which has already been collected in the past.

The information carryover request made from the image forming apparatus 1230 to the center machine may be made when the user logs in, or may be made periodically. For example, the information carryover request may be transmitted from each image forming apparatus 1230 to the center machine at a predetermined timing, such as once per day, once every half day, or the like. In this case, the information carryover request can include a list of user IDs of users who have logged into the apparatus in the corresponding period. The carryover unit 1380 can then return, as the carryover information, the operation-related information retained in association with each user ID listed in the information carryover request. This periodic exchange of requests and information makes it possible to reduce the amount of communication traffic in the system.

3-3. Flow of Processing

The flow of the basic processing executed by the image forming apparatus 1230 in the present variation example may be the same as the example described with reference to FIG. 8. However, the operation-related information transmitted to the image forming apparatus 1260, which is the center machine, in steps S802 and S809 in FIG. 8 is information for individual users, and may be transmitted with the user identification information added to each record of the operation-related information, for example.

Figure 13:
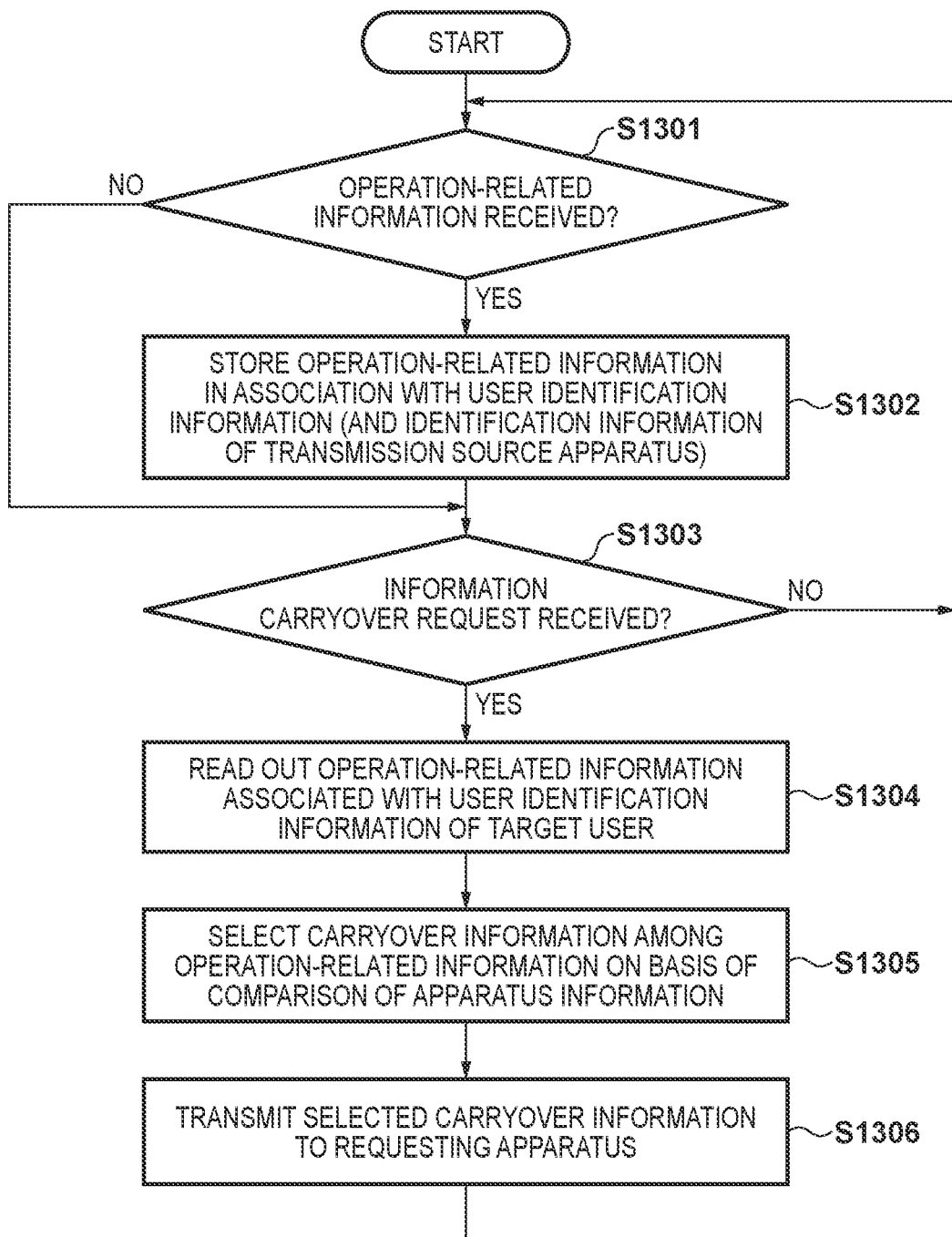
FIG. 13 is a flowchart illustrating an example of the flow of processing executed by a center machine according to a variation example.

FIG. 13 is a flowchart illustrating an example of the flow of processing executed by the image forming apparatus 1260, serving as a center machine, according to the present variation example. The processing illustrated in FIG. 13 can be realized by, for example, the CPU 242 executing a computer program loaded into the RAM 244 from the HDD 1245 of the image forming apparatus 1260.

First, in step S1301, the communication unit 1360 stands by to receive operation-related information from an apparatus in the system. The sequence moves to step S1302 once the operation-related information has been received. Meanwhile, the sequence moves to step S1303 if the operation-related information is not received.

If operation-related information has been received from an apparatus in the system, in step S1302, the information retaining unit 1370 stores, in storage, the received operation-related information in association with the user identification information (and the identification information of the transmission source apparatus, as necessary) also received at that time. The information retaining unit 1370 may store the received operation-related information as-is, or may store a result of subjecting the information to some kind of aggregation processing or statistical processing.

In step S1303, the communication unit 1360 stands by for the information carryover request. Here, the information carryover request may include the user identification information of the user for which the carryover is being performed. The sequence moves to step S1304 once the information carryover request is received. The standby for the operation-related information in step S1301 and the standby for the information carryover request in step S1303 may be performed substantially in parallel.

When the information carryover request has been received, in step S1304, the carryover unit 1380 reads out, from the storage, the operation-related information associated with the user identification information of the target user. Then, in step S1305, the carryover unit 1380 selects the carryover information from the read-out operation-related information on the basis of the comparison of the apparatus information of the carryover source and carryover destination apparatuses. Next, in step S1306, the communication unit 1360 transmits the carryover information selected by the carryover unit 1380 to the apparatus that is the source of the request (i.e., the carryover destination).

Figure 14:
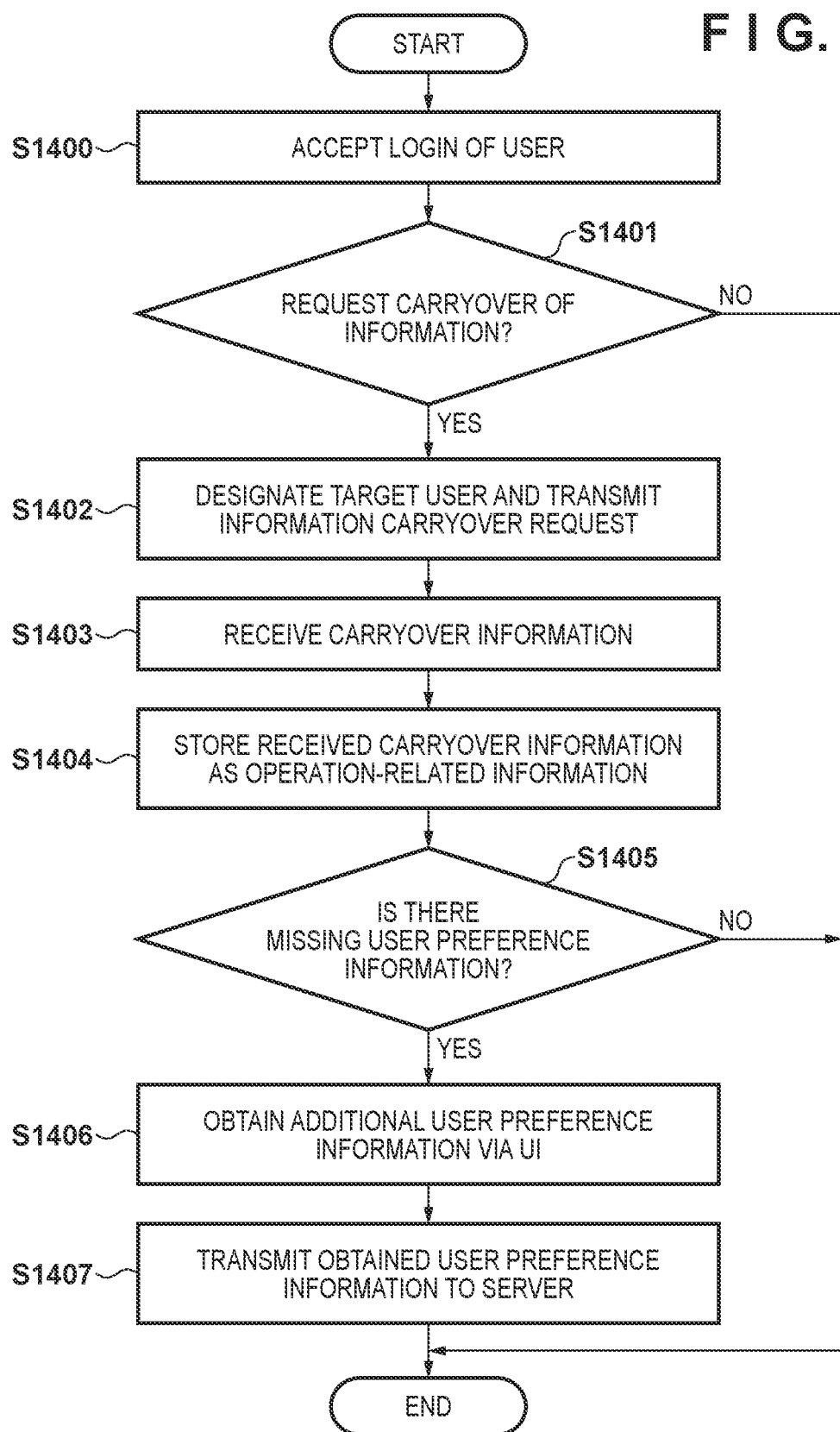
FIG. 14 is a flowchart illustrating an example of the flow of carryover information obtainment processing executed by the image forming apparatus according to a variation example.

FIG. 14 is a flowchart illustrating an example of the flow of processing for carrying over operation-related information, executed by the image forming apparatus 1230 in the present variation example. The processing illustrated in FIG. 14 can be realized by, for example, the CPU 242 executing a computer program loaded into the RAM 244 from the HDD 245.

First, in step S1400, the user identifying unit 1305 accepts login by a user and obtains the user identification information of the logged-in user. Then, in step S1401, the information retaining unit 1325 determines whether or not to request carryover of operation-related information of the identified user. For example, the information retaining unit 1325 may determine not to request the carryover of the operation-related information if the operation-related information of the identified user is already stored locally. In this case, the processing illustrated in FIG. 14 ends. Meanwhile, if the operation-related information of the identified user has not been retained, the information retaining unit 1325 determines to request the carryover of the operation-related information, and the sequence moves to step S1402. Note that even if the operation-related information of the identified user is retained locally, the information retaining unit 1325 may determine to request the carryover of the operation-related information in order to additionally receive carryover information collected by another apparatus. The information retaining unit 1325 may cause the carryover request window 600, illustrated in FIG. 6, to be displayed in the screen, and determine whether or not to request the carryover of the operation-related information on the basis of the user input.

In step S1402, the communication unit 1340 transmits the information carryover request to the image forming apparatus 1260. The information carryover request transmitted here may include the user identification information of the user identified in step S1400. The information carryover request may further include the authentication information. Next, in step S1403, the communication unit 1340 receives the carryover information provided from the image forming apparatus 1260 in response to the information carryover request. The carryover information received here includes the operation-related information for the user identified in step S1400. Then, in step S1404, the information retaining unit 1325 stores the carryover information received from the image forming apparatus 1260 in the HDD 245 as the operation-related information used to adjust or set the operations of the printer device 100 of the image forming apparatus 1230.

Next, in step S1405, the information retaining unit 1325 determines whether or not there are information items missing from the user preference information included in the carryover information with respect to the information items which can be used to adjust or set the operations of the image forming apparatus 1230. If there is a missing information item, additional user preference information is obtained and stored in step S1406, and the additional user preference information is transmitted to the image forming apparatus 1260 along with the user identification information in step S1407, in the same manner as in steps S1006 and S1007 in FIG. 10.

The image forming apparatus 1230 then enters a standby state. The processing executed by the image forming apparatus 1230 in the standby state has already been described, and thus redundant descriptions will not be given here.

Note that if the image forming apparatus 1260, which is the center machine, also does not have operation-related information for the logged-in user, a notification indicating that there is no carryover information may be made from the image forming apparatus 1260 to the image forming apparatus 1230 in step S1403, instead of receiving the carryover information. In this case, the user preference obtaining unit 310 of the image forming apparatus 1230 may obtain the user preference information through a user interface, in the same manner as in step S801 of FIG. 8.

As described above, according to the present variation example, the operation-related information associated with a specific user is selected from operation-related information collected by a plurality of apparatuses, and the selected information is carried over to individual apparatuses. According to this configuration, the time required to accumulate a sufficient amount of information for adjusting operations can be shortened, and operations optimized for individual users can therefore be realized more quickly. If such carryover is not performed, even if, for example, a newly-introduced printer has a function for adjusting operations in accordance with a user's preferences or tendencies, that printer cannot acquire the user's preferences or tendencies initially upon introduction, and is therefore only able to perform standard printing operations. Thus, personalizing or optimizing the operations would only be possible after a sufficient amount of operation-related information has been accumulated over a relatively long period of time. In contrast, according to the present variation example, information is carried over per user, from operation-related information already collected on a user-by-user basis, and thus in an environment where a plurality of users use the system, personalization or optimization specialized to individual users can be provided as soon as the user starts using the apparatus.

Although an example in which user IDs that identify individual users are used as the user identification information has been described here, the present variation example is not limited to this example. For example, a group ID assigned to a group to which one or more users belong may be used instead of user IDs.

4. Conclusion

Embodiments of the present disclosure have been described in detail thus far with reference to FIG. 1 to 14. In the above-described embodiments, operation-related information related to an operation of an image forming unit of a first image forming apparatus in an image forming system is carried over to a second image forming apparatus when the second image forming apparatus is newly used in the image forming system. The operation-related information which is carried over is used for an operation of an image forming unit of the second image forming apparatus. According to this configuration, appropriate image processing operations can be provided quickly in the newly-used apparatus without wasting time on re-collecting information that has already been collected by another apparatus. Moreover, in the above-described embodiments, the operation-related information is information used to adjust or set an image forming operation. Accordingly, the second image forming apparatus can appropriately adjust or set the operation of its image forming unit by using the operation-related information which has been carried over.

Additionally, in the above-described embodiments, the operation-related information may include user preference information expressing a user's preference with respect to one or more performance indicators of an image forming operation. In this case, the image forming operation can be adjusted in accordance with the user's preference, which indicates, for example, what sort of performance indicators are important to the user, and this in turn makes it possible to personalize the image forming operation as soon as a new apparatus starts being used, without re-inputting the user preference information. This eliminates the need for the user to re-input the user preference information, which lightens the burden of the input operations.

Additionally, in the above-described embodiments, the operation-related information may include operation history information of a past operation of the first image forming unit. In this case, the image forming operation can be adjusted in accordance with a tendency figured out from the operation history, which makes it possible to optimize the image forming operation on the basis of a tendency, such as a paper size which is used frequently or an average printing ratio, as soon as the new apparatus starts being used. In other words, the operation history information obtained by the first image forming apparatus is carried over to the second image forming apparatus which is newly used in the image forming system, and the image forming unit of the second image forming apparatus is controlled on the basis of that operation history information. This makes it possible to make the image forming operations of the second image forming apparatus suitable operations based on a past tendency, as soon as the apparatus starts being used.

Additionally, in the above-described embodiments, the operation-related information may include environmental condition information related to at least one of a past temperature and humidity in an operating environment of the first image forming apparatus. In this case, by re-using environmental condition information accumulated in the past, image forming operations suited to the operating environment of a new apparatus can be provided as soon as the new apparatus starts being used.

Additionally, in the above-described embodiments, the carryover information may be selected on the basis of a comparison between apparatus information related to a function, configuration, and use of the first image forming apparatus with apparatus information related to a function, configuration, and use of the second image forming apparatus. In this case, information which is not suited to being carried over due to differences in the functions, configurations, and uses, and information which has no practical application for the second image forming apparatus, can be excluded from the carryover information, which makes it possible to reliably ensure that the operations of the second image forming apparatus will be suitable after the carryover. When the carryover information is selected in accordance with a predefined criterion for each information item in the operation-related information, information which is, for example, useful only for a single apparatus and by nature is not suited to reuse between apparatuses can be excluded from the carryover information.

In the above-described embodiments, examples in which the technique according to the present disclosure is applied in an image forming system including an apparatus that performs an image forming operation have been described. However, the above-described technique for carrying over operation-related information can be broadly applied in image processing systems including image processing apparatuses, such as, for example, document reading or scanning apparatuses.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-227701, filed on Dec. 17, 2019 which is hereby incorporated by reference herein in its entirety.

What is claimed is:

1. An image forming system comprising at least a first image forming apparatus,
   wherein the first image forming apparatus includes a first image forming unit and an obtaining unit configured to obtain operation-related information related to an operation of the first image forming unit, and
   wherein the image forming system further comprises:
   a carryover unit configured to carry over, to a second image forming apparatus, information related to an operation of a second image forming unit of the second image forming apparatus among the operation-related information obtained by the obtaining unit of the first image forming apparatus when the second image forming apparatus is newly used in the image forming system, and
   the operation-related information includes operation history information of the first image forming unit.

2. The image forming system according to claim 1, wherein the operation-related information is information used to adjust or set an image forming operation.

3. The image forming system according to claim 1, wherein the operation-related information includes user preference information expressing a user's preference with respect to one or more performance indicators of an image forming operation.

4. The image forming system according to claim 3, wherein the one or more performance indicators include at least one of image quality, quietness, productivity, apparatus lifetime, energy-saving performance, and first output time.

5. The image forming system according to claim 3, wherein the first image forming apparatus uses the user preference information to adjust or set an operation of the first image forming unit, the user preference information having been obtained from the user via a user interface, and
the second image forming apparatus uses the user preference information carried over by the carryover unit to adjust or set an operation of the second image forming unit.

6. The image forming system according to claim 1, wherein the operation history information relates to at least one of a paper size, a paper type, a number of printouts, and an average printing ratio in operations in the past.

7. The image forming system according to claim 1, wherein the operation-related information includes environmental condition information related to at least one of a past temperature and humidity in an operating environment of the first image forming apparatus.

8. The image forming system according to claim 1, wherein the operation-related information includes analysis result information generated by analyzing one or both of operation history information of the first image forming unit and environmental condition information of an operating environment of the first image forming apparatus.

9. The image forming system according to claim 1, wherein the carryover unit selects the information, among the operation-related information, to carry over to the second image forming apparatus by comparing apparatus information related to a function, configuration, and use of the first image forming apparatus with apparatus information related to a function, configuration, and use of the second image forming apparatus.

10. The image forming system according to claim 1, wherein the carryover unit selects the information, among the operation-related information, to be carried over to the second image forming apparatus in accordance with a predefined criterion for each of information items of the operation-related information.

11. The image forming system according to claim 1, wherein the carryover unit carries over, to the second image forming apparatus, information used to adjust or set an operation of the second image forming unit of the second image forming apparatus among operation-related information obtained by one or more image forming apparatuses including the first image forming apparatus that have been present in the image forming system from before the use of the second image forming apparatus.

12. The image forming system according to claim 11, further comprising:
a retaining unit configured to retain the operation-related information in association with user identification information,
wherein the carryover unit carries over, to the second image forming apparatus, information associated with the user identification information of a user that uses the second image forming apparatus among the operation-related information.

13. The image forming system according to claim 1, further comprising:
a server apparatus including the carryover unit.

14. The image forming system according to claim 1, wherein the first image forming apparatus includes the carryover unit.

15. An information carryover method, comprising:
obtaining, by a first image forming apparatus in an image forming system, operation-related information related to an operation of a first image forming unit of the first image forming apparatus; and
when a second image forming apparatus is newly used in the image forming system, carrying over, by a carryover unit of the image forming system to a second image forming apparatus, information related to an operation of a second image forming unit of the second image forming apparatus among the operation-related information obtained by the first image forming apparatus,
wherein the operation-related information includes operation history information of the first image forming unit.

16. A server apparatus in an image forming system, the system including at least a first image forming apparatus, and the server apparatus comprising:
a retaining unit configured to retain operation-related information related to an operation of a first image forming unit of the first image forming apparatus; and
a carryover unit configured to carry over, to a second image forming apparatus, information related to an operation of a second image forming unit of the second image forming apparatus among the operation-related information, when the second image forming apparatus is newly used in the image forming system,
wherein the operation-related information includes operation history information of the first image forming unit.

17. A non-transitory computer-readable storage medium storing a computer program that causes a processor of a server apparatus in an image forming system including at least a first image forming apparatus to function as:
a retaining unit configured to retain operation-related information related to an operation of a first image forming unit of the first image forming apparatus; and
a carryover unit configured to carry over, to a second image forming apparatus, information related to an operation of a second image forming unit of the second image forming apparatus among the operation-related information, when the second image forming apparatus is newly used in the image forming system,
wherein the operation-related information includes operation history information of the first image forming unit.

18. An image forming apparatus in an image forming system, the apparatus comprising:
an image forming unit;
an obtaining unit configured to obtain operation-related information related to an operation of the image forming unit; and
a retaining unit configured to retain the operation-related information obtained by the obtaining unit, wherein the retaining unit is configured to carry over and retain, from a carryover unit of the image forming system, information related to an operation of the image forming unit among operation-related information obtained by another image forming apparatus present in the image forming system, when the image forming apparatus is newly used in the image forming system, the operation-related information including operation history information of the another image forming apparatus.

19. An image processing system comprising at least a first image processing apparatus, wherein the first image processing apparatus includes a first image processing unit and an obtaining unit configured to obtain operation-related information related to an operation of the first image processing unit, and wherein the image processing system further comprises:

a carryover unit configured to carry over, to a second image processing apparatus, information related to an operation of a second image processing unit of the second image processing apparatus among the operation-related information obtained by the obtaining unit of the first image processing apparatus, when the second image processing apparatus is newly used in the image processing system, the operation-related information includes operation history information of the first image processing unit.

20. An image forming system comprising at least a first image forming apparatus, wherein the first image forming apparatus includes a first image forming unit and an obtaining unit configured to obtain operation history information of the first image forming unit, and wherein the image forming system further comprises:

a carryover unit configured to carry over, when a second image forming apparatus including a second image forming unit is newly used in the image forming system, the operation history information obtained by the obtaining unit of the first image forming apparatus to the second image forming apparatus so that the second image forming unit is controlled on the basis of the operation history information.

* * * * *